US008300078B2

(12) United States Patent
Lovhaugen et al.

(10) Patent No.: US 8,300,078 B2
(45) Date of Patent: Oct. 30, 2012

(54) COMPUTER-PROCESSOR BASED INTERFACE FOR TELEPRESENCE SYSTEM, METHOD AND COMPUTER PROGRAM PRODUCT

(75) Inventors: Norma Lovhaugen, Asker (NO); Torkel Steffen Mellingen, Oslo (NO); Eamonn Shaw, Hvalstad (NO)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 12/561,933

(22) Filed: Sep. 17, 2009

(65) Prior Publication Data
US 2010/0073454 A1    Mar. 25, 2010

Related U.S. Application Data

(60) Provisional application No. 61/097,779, filed on Sep. 17, 2008.

(30) Foreign Application Priority Data

Sep. 17, 2008 (NO) .................................... 20083963

(51) Int. Cl.
H04N 7/14    (2006.01)
(52) U.S. Cl. ................. 348/14.03; 348/14.08; 348/14.09
(58) Field of Classification Search .... 348/14.01–14.03, 348/14.08–14.09, 14.1, 14.12
See application file for complete search history.

(56) References Cited

U.S. PATENT DOCUMENTS
6,724,403 B1    4/2004 Santoro et al.
2003/0074672 A1    4/2003 Daniels
2005/0027724 A1    2/2005 Minamino et al.
2005/0188321 A1    8/2005 Adams et al.

FOREIGN PATENT DOCUMENTS
| JP | 06-070039 | 3/1994 |
| JP | 6-274596 | 9/1994 |
| JP | 2007-096974 | 4/2007 |
| WO | 2007/123965 A2 | 11/2007 |
| WO | 2007/140459 A2 | 12/2007 |
| WO | 2008/101117 A1 | 8/2008 |

OTHER PUBLICATIONS

U.S. Appl. No. 29/342,244, filed Aug. 20, 2009, Mellingen, et al.
U.S. Appl. No. 29/313,109, filed Dec. 8, 2008, Roed, et al.

Primary Examiner — Suhan Ni
(74) Attorney, Agent, or Firm — Oblon, Spivak, McClelland, Maier & Neustadt, L.L.P.

(57) ABSTRACT

A computer-implemented interface for a local telepresence video conferencing facility, pre-assigns displays at the local telepresence video conferencing facility to respective video images from remote telepresence video conference facilities such that respective video images from the remote telepresence video conference facilities will be displayed on corresponding displays at the local telepresence video conferencing facility once communications connections are made. A controller pre-assigns the displays according to control commands from a tactile input device prior to establishing the communication connections with the remote telepresence video conference facilities. A touchscreen display presents avatars of remote conference participants to illustrate pre-assignments of displays to particular remote telepresence video conference facilities prior to the communication connections being made.

22 Claims, 18 Drawing Sheets

COMPUTER-PROCESSOR BASED INTERFACE FOR TELEPRESENCE SYSTEM, METHOD AND COMPUTER PROGRAM PRODUCT

CROSS-REFERENCE TO RELATED APPLICATIONS

The present non-provisional application claims priority from U.S. provisional application 61/097,779 filed on Sep. 17, 2008, the entire subject matter of which is incorporated herein by reference. Further, the present non-provisional application contains related subject matter to U.S. provisional application filed Mar. 16, 2007 and having Application Ser. No. 60/895,331, Norwegian patent application No. 20071401, filed on Mar. 16, 2007, U.S. provisional application Ser. No. 61/122,155 filed Dec. 12, 2008, and U.S. patent application Ser. No. 12/050,004, filed Mar. 17, 2008, the entire contents of all these documents being incorporated herein by reference.

BACKGROUND

1. Field of the Invention

The present invention relates to a computer-processor based method and system for creating a dynamic interactive graphical user interface (GUI) for a videoconferencing system, method, and a computer program product having telepresence features that visually presents how a video layout of a multi-screen video conference will be experienced by the users prior to the initiation of the telepresence videoconference.

2. Description of the Related Art

Conventional videoconferencing systems include a number of end-points that communicate real-time video, audio and/or data (often referred to as "duo video") streams over and between various networks such as WAN, LAN and circuit switched networks.

A number of videoconference systems residing at different sites may participate in a same conference, most often, through one or more MCU's (Multipoint Control Unit) performing, among other things, switching rate conversion, and transcoding functions to allow the audiovisual terminals to intercommunicate properly. The MCU also allows for aggregate presentation on one display of several end users located at different endpoints.

A compression of multimedia data to be transmitted, as well as a decompression of the multimedia data to be received, takes place in a processor unit conventionally referred to as a "codec" (coder/decoder).

As videoconferencing involves various resources and equipment simultaneously interoperating at different places with varying capabilities, there is also a need as recognized by the present inventor for the possibility to manage the resources involved both for scheduled and ad hoc videoconferences through a video conference graphical user interface (GUI) of a controller.

Video conferencing systems presently provide communication between at least two locations for allowing a video conference among participants situated at endpoints at each location. Conventionally, the video conferencing arrangements are provided with one or more cameras. The outputs of those cameras are transmitted along with audio signals to a corresponding plurality of displays at a second location such that the participants at the first location are perceived to be present, or face-to-face, with participants at the second location.

Telepresence systems are enhanced video conference systems. Typically, terminals in telepresence systems have a plurality of large scale displays for life-sized video, often installed in rooms with interiors dedicated for video conferencing, all to create an environment as close to personal face-to-face meetings as possible. The images captured by the plurality of high-definition cameras are usually arranged and displayed so that they generate a non-overlapping and/or contiguous field of view. This is in contrast to traditional so-called "Continuous presence" where the video streams are mixed (e.g. a mosaic) in an MCU from source images at endpoints and displayed together on one display in a screen split (N*M array).

Video cameras are often arranged on top of the display screens in order to capture images of the local participants, and are transmitted to corresponding remote video conference sites.

Key factors in achieving a feeling of presence are the ability to see at whom the remote participants are looking, that all the participants are displayed in real life size, and that all displayed participants appear equally sized relative to each other. Another provision for achieving high quality telepresence is that the images of the remote participants are presented to each local participant as undistorted as possible.

In order to obtain this feeling of presence, a set of rules, or a proprietary protocol, is used by the telepresence systems such as that described in U.S. patent application Ser. No. 12/050,004. That set of rules (or protocol) defines e.g. camera positions (pan, tilt zoom), codec connection scheme (which local codec should call which remote codec), etc. In known telepresence systems, the user dials (or selects from a phonebook) the remote telepresence sites (and/or other video endpoints) he/she wishes to join in the conference. When the call is launched, the system decides how and where the different remote sites are displayed on the local displays. This may, for example, depend on call sequence (e.g. in a four-site multisite call the first called site is displayed on the left screen, second called on center screen, and third called on right screen), or it may appear to be totally random.

This automatic call launch may not result in a layout as desired by the user. Suppose that one of the remote sites in a four-site multi-site call is the Board of Directors of a company. The other two remote sites are of ancillary status. The caller would most likely wish to have the Board of Directors displayed on the center display, undisturbed and unobstructed. This is almost impossible to control in current systems in an easy and user friendly way.

The eye-contact issue, and the feeling of participants from different sites being present in the same room is not fully resolved in conventional systems, as they capture the same picture and send the same to all the sites, thus making the movements of the participants look unnatural when they face a certain display (and associated camera) to talk to the participants displayed therein. Furthermore, with these telepresence systems, there is no conventional mechanism for interconnecting different telepresence sites that are located on different networks. Moreover, firewall traversal limits the ability to seamlessly establish connections between different telepresence sites. Thus conventional telepresence systems have been restricted to dedicated, high-bandwidth communication lines. Conventional telepresence systems are usually standalone systems that are not well integrated with other computer resources and video conference resources within a particular company's facilities. Users of these telepresence systems are handicapped by having relatively limited amount of flexibility in adding other non-telepresence systems endpoints, and establishing calls between telepresence endpoints and other non-telepresence endpoints.

Other conventional systems like that described in WO 2007/140459 describe certain camera and display screen associations to provide a blended space effect. However, as recognized by the present inventor, there is neither a tactile display present within reach of a user to pre-assign images of users at remote facilities to particular screens, nor a controller that operates on user input to make the pre-assignments.

Moreover, conventional systems have a user operate/configure the videoconference system via a non-graphical remote control as the connections are being made. This makes for a frustrating experience for users not familiar with the telepresence system at hand, particularly when an urgent meeting is about to begin.

SUMMARY

One aspect of the present invention is to address and resolve the above limitations with conventional systems, methods and computer program products.

In a first aspect, the present invention includes a computer-based video conference graphical user interface (GUI) adapted to communicate with other corresponding video conference arrangements, terminals and endpoints, the video conference arrangement including one or more displays, a computer processor with memory running software to create a GUI, hardware or wireless components to establish GUI access to the network and thereby acquire remote teleconference end point contact information, hardware or wireless network access to the codec components that control the content of display screens and hardware of remote videoconferencing end points.

In another aspect, the GUI is resident on a mobile computer, personal data assistant (PDA), cell phone, or the like that may be taken out of the videoconference room to configure a videoconference.

In yet another aspect, the GUI is a graphics-based controller for configuring the conference before the first connection is made. The configuration is optionally established through a telepresence server (TS) that coordinates the ultimate connections between telepresence systems, regardless if the TS is located at one of the systems or at a location that is different than any of the participating telepresence systems. This GUI allows unsophisticated users an easy and non-stressful way to establish the teleconference system configuration by having a visual display of how the users will be displayed in a simulated telepresence room before the conference takes place, allowing a relatively unsophisticated user to feel confident that they have properly prepared for the telepresence session before it starts. When a TS is used to make initial assignments of remote facilities to local displays, the user may subsequently change the assignments via the GUI, using a touch-panel display.

As should be apparent, the invention can provide a number of advantageous features and benefits. It is to be understood that, in practicing the invention, an embodiment can be constructed to include one or more features or benefits of embodiments disclosed herein, but not others. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

The invention will be better understood from reading the description which follows and from examining the accompanying figures. These are provided solely as nonlimiting examples of the invention. In the drawings.

DETAILED DESCRIPTION OF THE PREFERRED EMBODIMENTS

Figure 1:
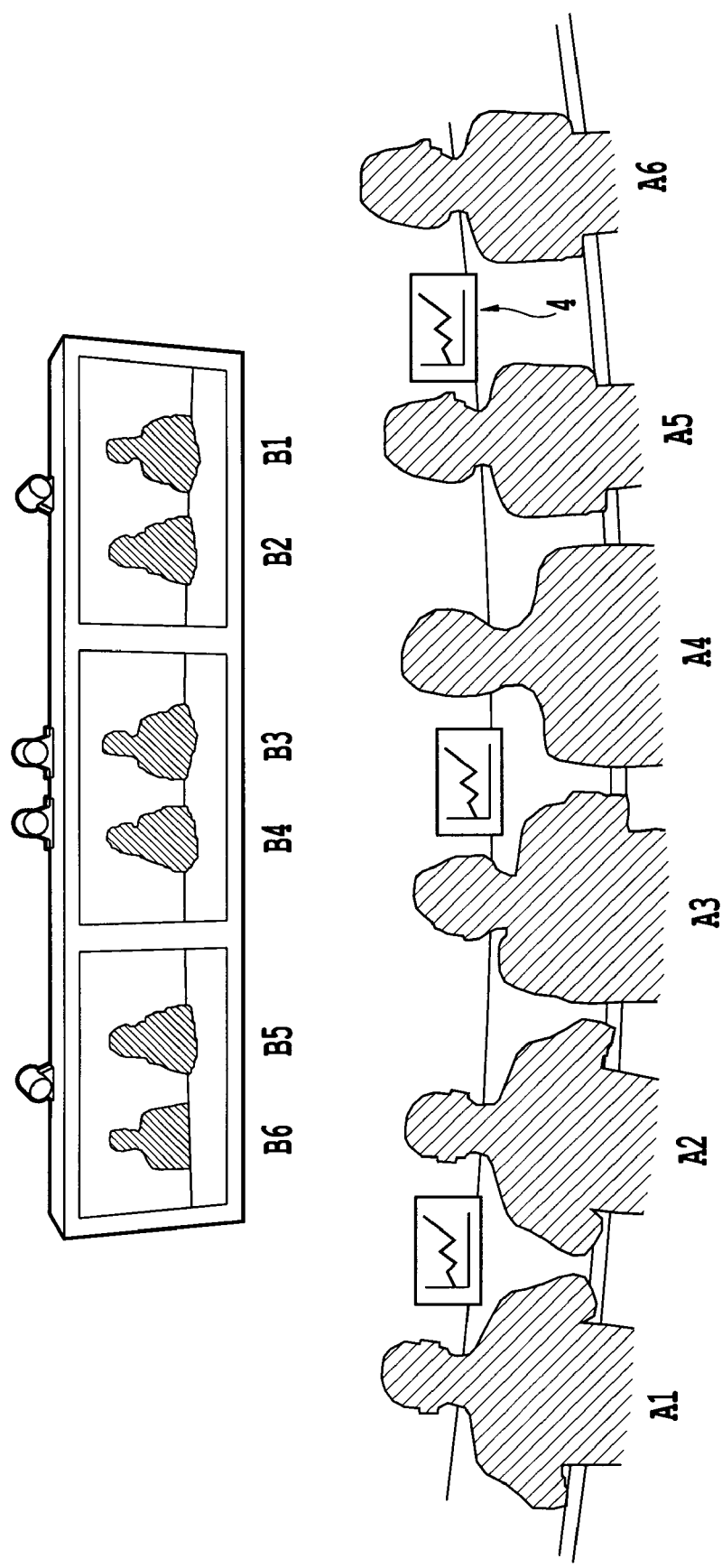
FIG. 1 is an illustration of a telepresence videoconferencing setup according to an embodiment of the invention.

Reference will now be made in detail to the present preferred embodiments of the invention, examples of which are illustrated in the accompanying drawings. Wherever possible, the same reference characters will be used throughout the drawings to refer to the same or like parts.

FIG. 1 shows a local telepresence video conferencing facility used by local participants (A1 to A6), which provides the local participants a feeling of actually being present in the same meeting-room as the remote participants (B1 to B6) that are shown on the respective displays (e.g., flat panel high resolution displays) 1, 2 and 3. As will be discussed in more detail, the users are provided with a tactile input device having a touchscreen display 4 (sometimes referred to as a combo display), which is mounted at an angle with respect to an upper surface of the table 4A on which they are mounted. The touchscreen displays 4 provide a tactile mechanism by which the local participants can provide input to the GUI. Each of the respective display screens 1, 2, and 3 has at least one camera associated therewith, as shown. For example, the leftmost and rightmost displays have one camera positioned at the their top middle portions, while the center display screen has two cameras position on the top. It should be noted that the center display screen could also be used with a single camera positioned thereon.

Figure 2:
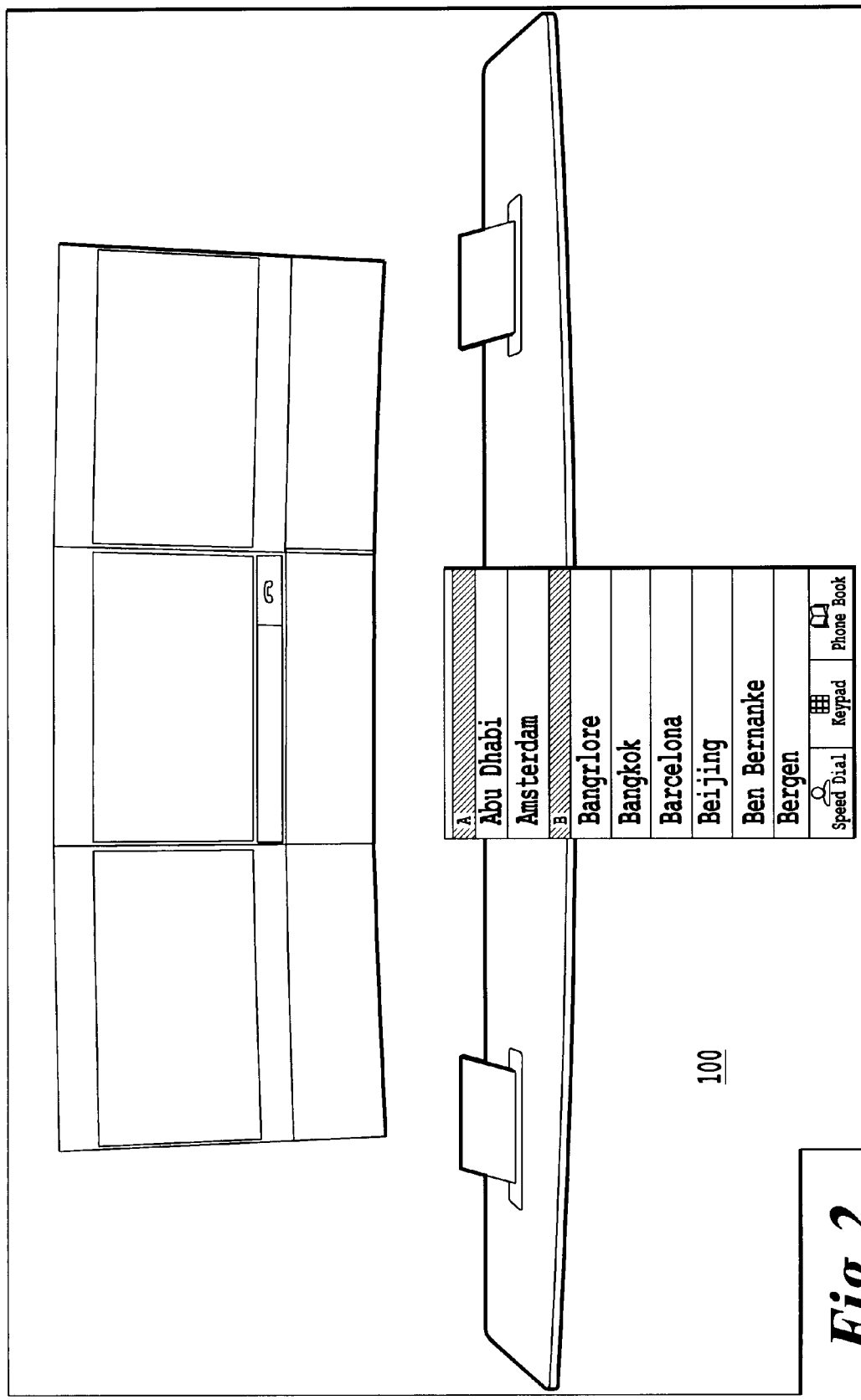
FIG. 2 illustrates the graphical user interface (GUI) of the control system according to the present invention.
Figure 15:
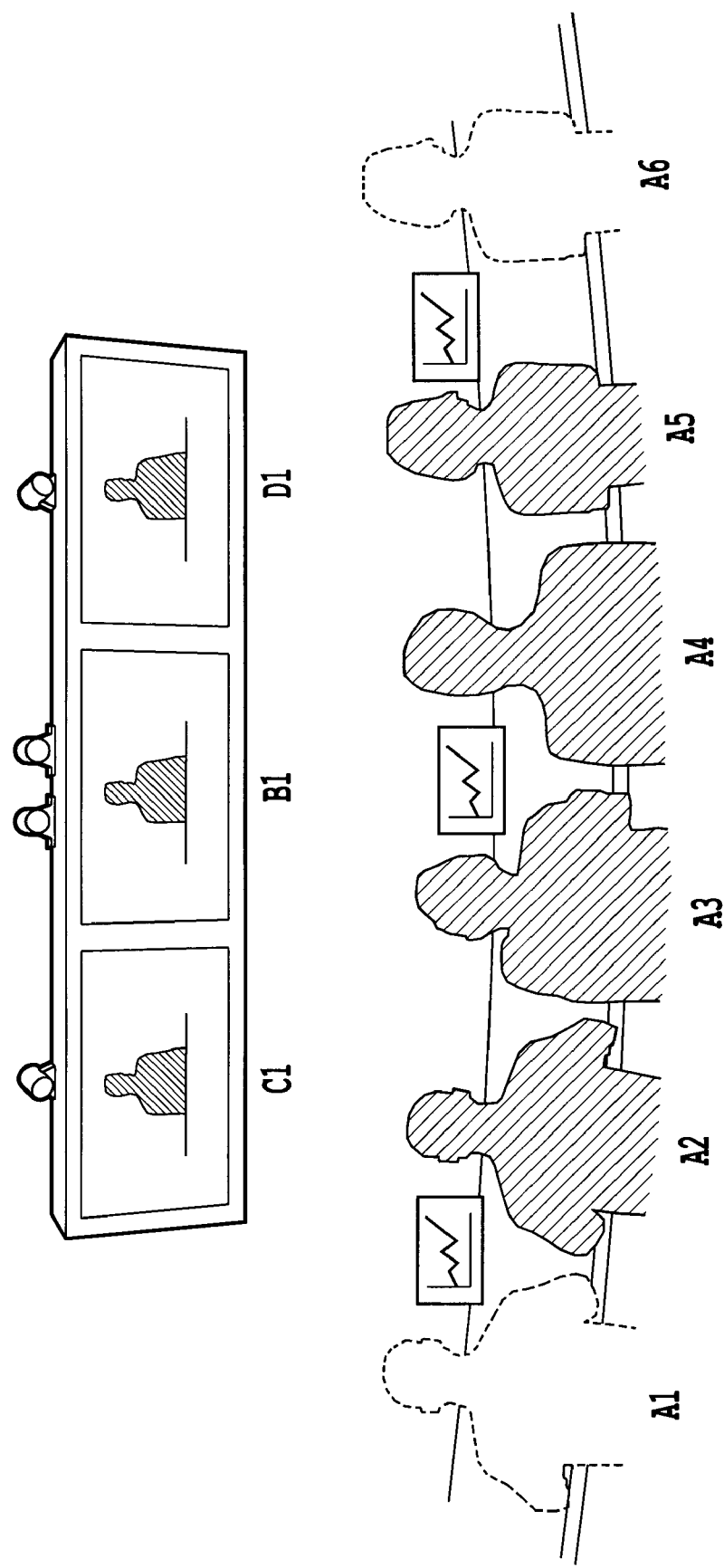
FIG. 15 is an illustration of the GUI keypad 6 according to one embodiment of the present invention.

In FIG. 2, the graphical user interface (GUI) 100 is presented on the touchpanel display 4 (FIG. 1) in its nominal state when no meeting has yet been set up, but a speed-dial 5 menu is selected. A corresponding GUI image is presented in FIG. 12 with the left replica display 41, center replica display 42, right replica display 43, speed dial 5, keypad 6, phone book 7, and available contact field icons 8 shown. FIG. 15 is similar but shows the keypad selected for dialing. Selecting the phonebook 7 is also available as a selectable option, where a more complete listing of contacts is saved in memory.

Figure 10:
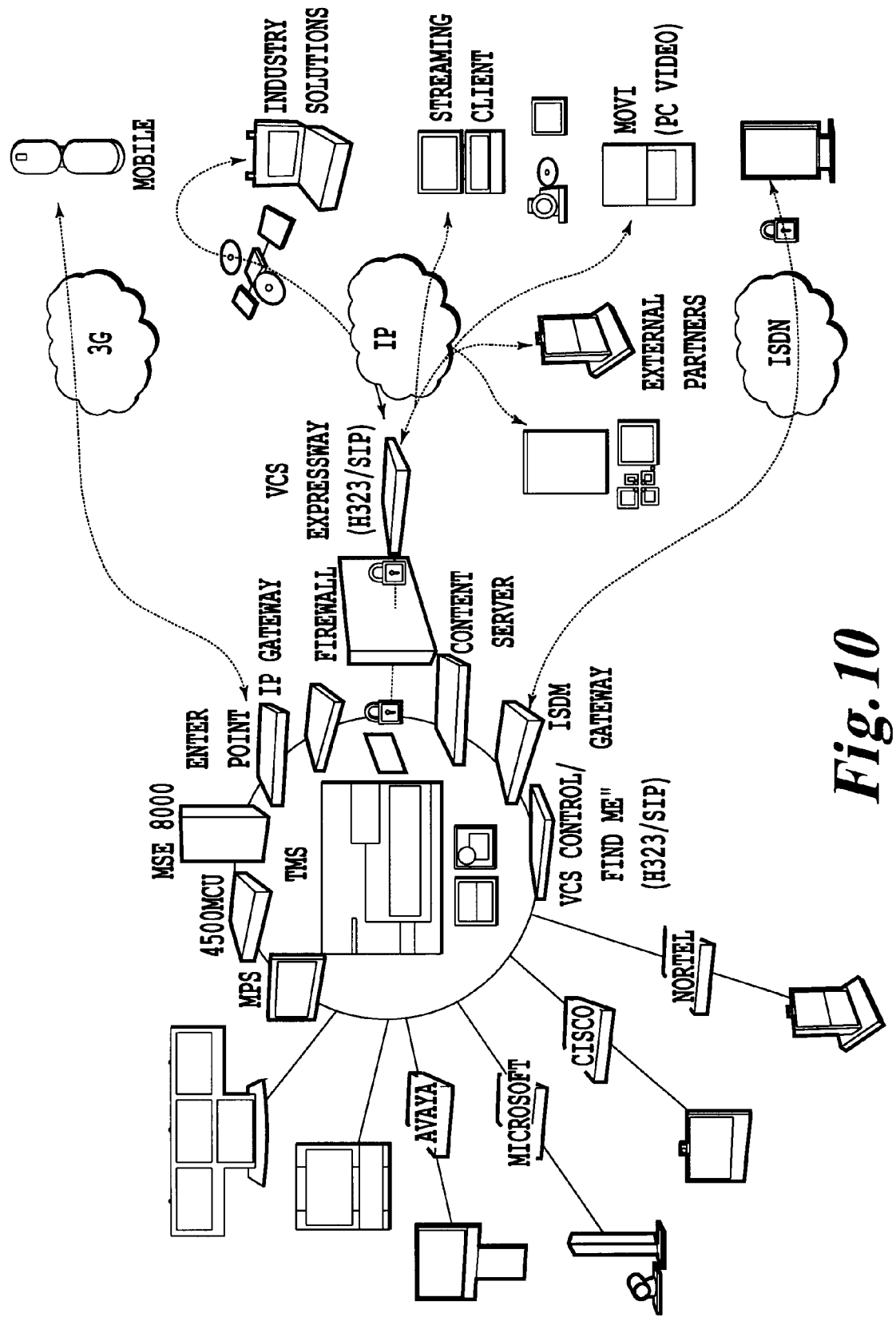
FIG. 10 is an illustration of a monitor and camera arrangement for a telepresence videoconference system.
Figure 11:
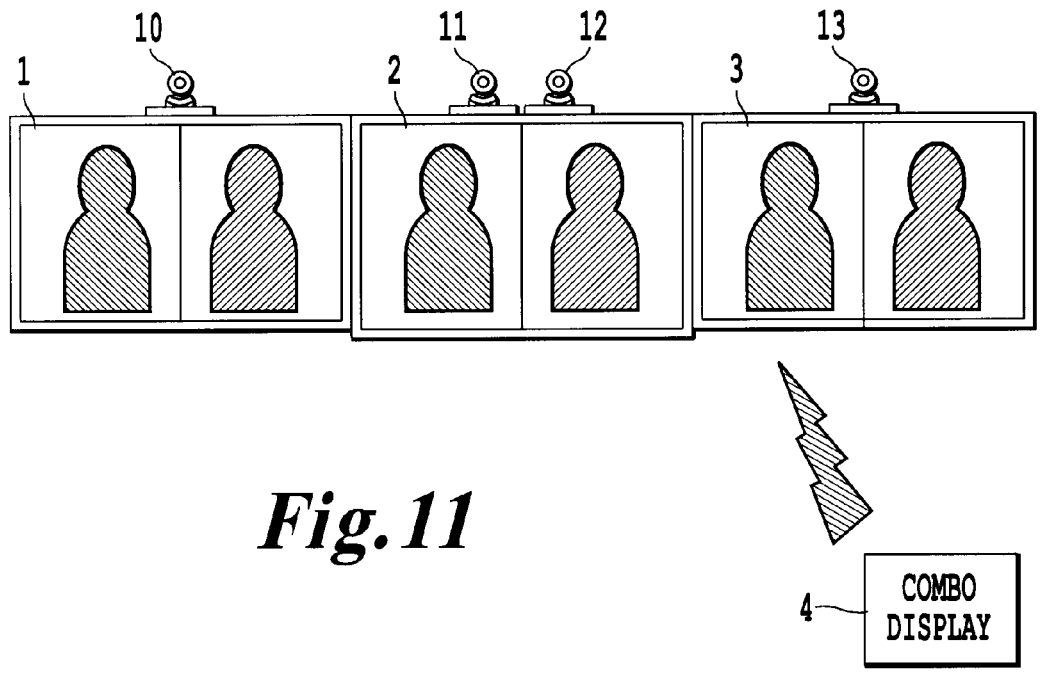
FIG. 11 is an illustration of the codec arrangement supporting a telepresence videoconference system.
Figure 18:
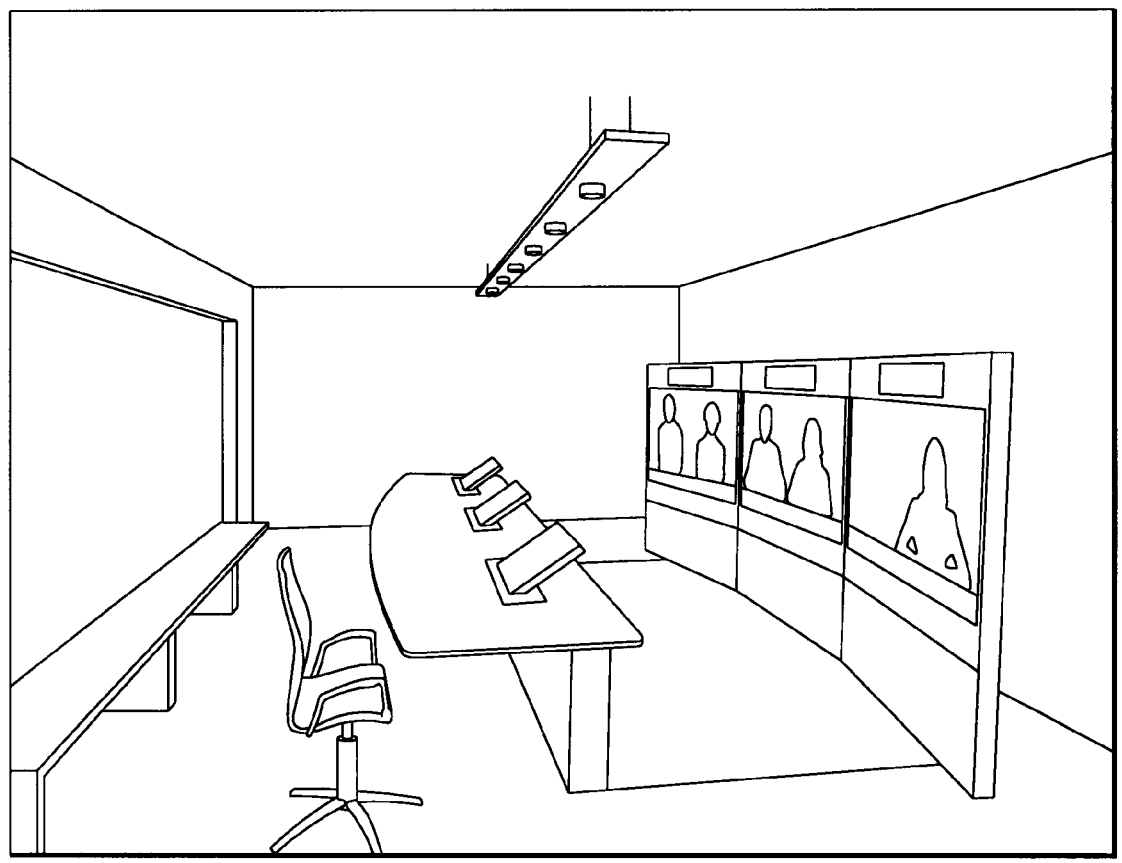
FIG. 18; illustrates the user interface of the control system according to the present invention when a user has configured the system for more endpoints than can be shown at a time, so the GUI allows icons to allow the user to switch between each endpoint on the call.
Figure 19:
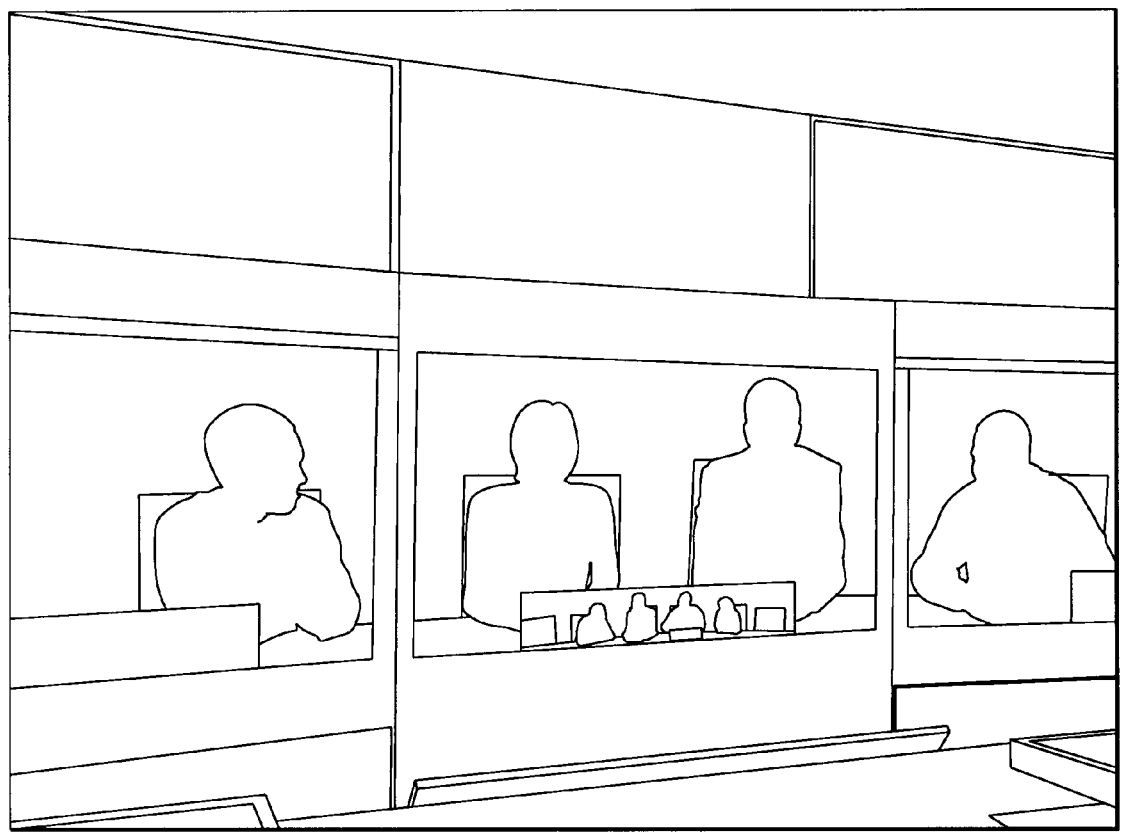
FIG. 19 illustrates the user interface of the control system according to the present invention when a user has configured the system for more endpoints than can be shown at a time, so the GUI allows icons to allow the user to switch between each endpoint on the call.

FIG. 10 shows the monitor and camera arrangement for the local video telepresence system which provides a realistic presence of participants in a videoconference by way of standards-based communication. Exemplary systems are also shown in FIGS. 18, 19, and 20 of U.S. provisional application 61/097,779, discussed above. At least one codec (e.g., codec 291 in FIG. 11, or FIGS. 21, and 22 of U.S. provisional application 61/097,779) and one camera (10-13 in FIG. 10) are associated with each display. The displays 1-3 (FIG. 10) are preferably large-scale flat panel high-definition television screens or projection screens placed side by side with the high definition cameras 11, 12 and 13 respectively placed on top of the displays. As recognized by the present inventor, the distance between the left edge of display 1 and the right edge of display 3 can be a fairly far distance such as 10 feet or more. Consequently, when a participant is looking toward remote participants displayed in the display 1, the user's head will be turned towards those users. As such, if one of the cameras 11, 12 or 13 were to capture the image of the user, that image would appear as though the user's head is turned towards a different direction. In contrast, an image captured by camera 10 would give the appearance to the participants displayed in display 1 that that participant is looking at them. Therefore, the distribution of the cameras 10-13 is preferable distributed across the three displays 1, 2 and 3 as shown. This effect will give the "turn-to" feel towards participants at remote sites. This "turn-to" perception, gives the impression to the remote participants that the user is either looking towards them when communicating with them or turned to one of the other remote participants when the user is speaking with them directly.

A videoconferencing terminal of the telepresence type, is arranged in front of one or more local conference participants. The local participants are located along a table (4A) in FIG. 1, facing the display 4 which includes one or more display screens 41, 42 and 43. In the illustrated example, three display screens are included: Left (1), center (2), and right (3) display screens are adjacent to one another. These screens are used for displaying images captured at one or more remote video telepresence sites. In a point to point conference between two telepresence systems, a typical setup has a maximum of six participants at each local site and where two participants are displayed at each screen from the respective remote site. In a multisite call between (3-4 telepresence sites), a typical setup has a maximum of four participants at each local site and where four participants (or one remote site) is displayed at each screen from the respective remote sites (not shown). This reduces the telepresence feeling because the displayed participants appear smaller on the display, but allows for the inclusion of a third telepresence-capable system while maintaining a telepresence experience for the participants.

A different display device that is small enough to fit on a videoconference table 4A is referred to as a combo display 4, or a tactile input device in the form of a touchscreen display. One or several combo displays 4 may be arranged at the table 4A where the participants are seated. In typical use, the combo display 4 may be used for computer-generated presentations, to provide access and input to the GUI, or to access other secondary conference information. The combo display 4 includes a touch screen activated to enable users to efficiently manipulate the icons and other information on the display by the user imparting a force from their finger or other instrument on the screen.

The combo display 4 is angled toward at user, such that a top edge of the display (closest to the camera) is elevated with respect to an upper surface of the table, and the bottom edge being lower than the top edge and closer to the user. The angle may be varied between 5 degrees and 85 degrees for example. Mounting the combo display 4 on the participant's table 4A allows for tactile access to the display 4 and therefore becomes a useful tool to a user when initiating a telepresence conference. The display 4 permits the user to employ a GUI for establishing the conference, preassigning remote conference participants to particular displays prior to establishing the conference connections. The display 4 also allows for data input, and viewing of presentations, presentation materials for discussion, and shared applications (such as computer graphics) or for communicating with regular (e.g., H.323) videoconferencing endpoints.

A telepresence video conferencing facility as described above has "telepresence" which means that the display size of an individual at the remote site is generally life size. As such, the division of a particular screen in the telepresence system does not reduce the size of the display of a person at a remote endpoint. Moreover, a six-foot person would be displayed having generally the same size as if seen in real life. This is in contrast to a traditional continuous presence layout in a traditional MCU-based video conference call, where when additional parties are included in the telepresence system, the screen is further divided and the size of the participant is displayed in a smaller area. The addition of a non-telepresence participant in the system shown in FIG. 1 would be displayed in either the left, center, or right displays 1,2,3 in a smaller "picture-in-picture" image as represented in the GUI shown in FIG. 4.

According to an aspect of the present invention, a conference between telepresence systems is arranged by setting up site-to-site connections between respective codecs of the endpoints, even if the conference is a multi-site conference. Which codecs and which endpoints (because there are multiple endpoints as will be discussed) to connect to each other, are selected by a controller to optimize the feeling of presence for the participants in the conference. Initial selections can be set by a teleconference server (TS), if present, or the controller at the local teleconference facility that initiates the conference. As an example, when the codec associated with the right camera and the right screen of site A (FIG. 11) in a conference is directly connected in a video conference link to the codec associated with the left camera and the left screen of site B, the participants of site A will experience that the participants of site B turn to them when the participants of site B look at the left screen where the participants of site A are displayed. Examples on how this will effect the selection of connections paths in different conference constellations are discussed further below.

The controller uses the following rules set regarding configuration and quantity to make the pre-assignments:

If only one remote telepresence system is selected to participate in a conference, each of said left, center, and right display icons of the replica are populated with two avatars 20 respectively, (so one remote telepresence system occupy all 3 screens); and If two or three remote telepresence systems are selected to participate in a conference, two or three of said left, center, and right display icons of the replica are each populated with four avatars, (now one remote telepresence system only occupy 1 screens, and 4 people is max (physical limitation of camera); and/or If only one or more remote non-telepresence systems are selected to participate in a conference, one or more of said left, center, and right display of the replica are each populated with one avatar (when no telepresence system Is present, the non-telepresence systems may be shown on the entire screen); and If a remote non-telepresence systems is selected to participate in a conference together with one or more telepresence systems, one of said left, center, and right display icons are populated with a small avatar on top of already present avatars, or if one of the display icons are not already populated by avatars representing a telepresence or a non-telepresence system the empty display icons are populated with one avatar (if e.g. there are 2 remote telepresence systems in the call, 1 of the screens are not in use, and this screen can be used for the non-telepresence endpoint. Telepresence endpoints have priority so if there are only 1 remote Telepresence or 3 or more remote Telepresence systems in the call, there are no free screens and the non-telepresence systems must be a PIP).

According to one aspect of the present invention, when a conference is established, the telepresence system initiating the conference is the master site. The master site controls the other telepresence systems in the conference keeping track of at least the status, identifying addresses of codecs, controlling the establishment of the conference, and rearranging the communication links when a telepresence systems joins or leaves during the conference. Alternatively, the TS could serve as the master site for providing feedback on the arrangement of displays to remote facilities prior to establishing connections to the remote facilities.

At the master site the combo display 4 has a user interface 100 (FIG. 2). The purpose of the user interface is to efficiently enable the user to readily access the contact information for other sites, make pre-assignments of video images from remote facilities to particular displays prior to establishing the connections, and configuring the participants and cameras to optimize the telepresence experience. The combo display 4 includes a touchpanel display that enables either presentation materials to be shown on the display as well as the graphical user interface (GUI) as needed for operation and system set-up. More than one combo display may be available in one or more locations on the table 4A where meeting participants are seated during a videoconference as shown in FIG. 1. The combo display 4 may be detachably attached to a docking station or port so as to communicate with the master codec and other components. The combo display may also "connect" wirelessly with the master codec or an intermediate radio frequency (RF) or infra-red (IR) sensor configured to send and receive data. For example, an RFID receiver 4C may receive signals from an RFID transmitter 4B that indicate pre-assignments of remote telepresence facilities to particular displays. In this way, a user of a local telepresence facility, may select a particular RFID transmitter 4B from a set of RFID transmitters that each include a different pre-assignment selection for automatically establishing a video teleconference with particular remote videoconference facilities.

Figure 12:
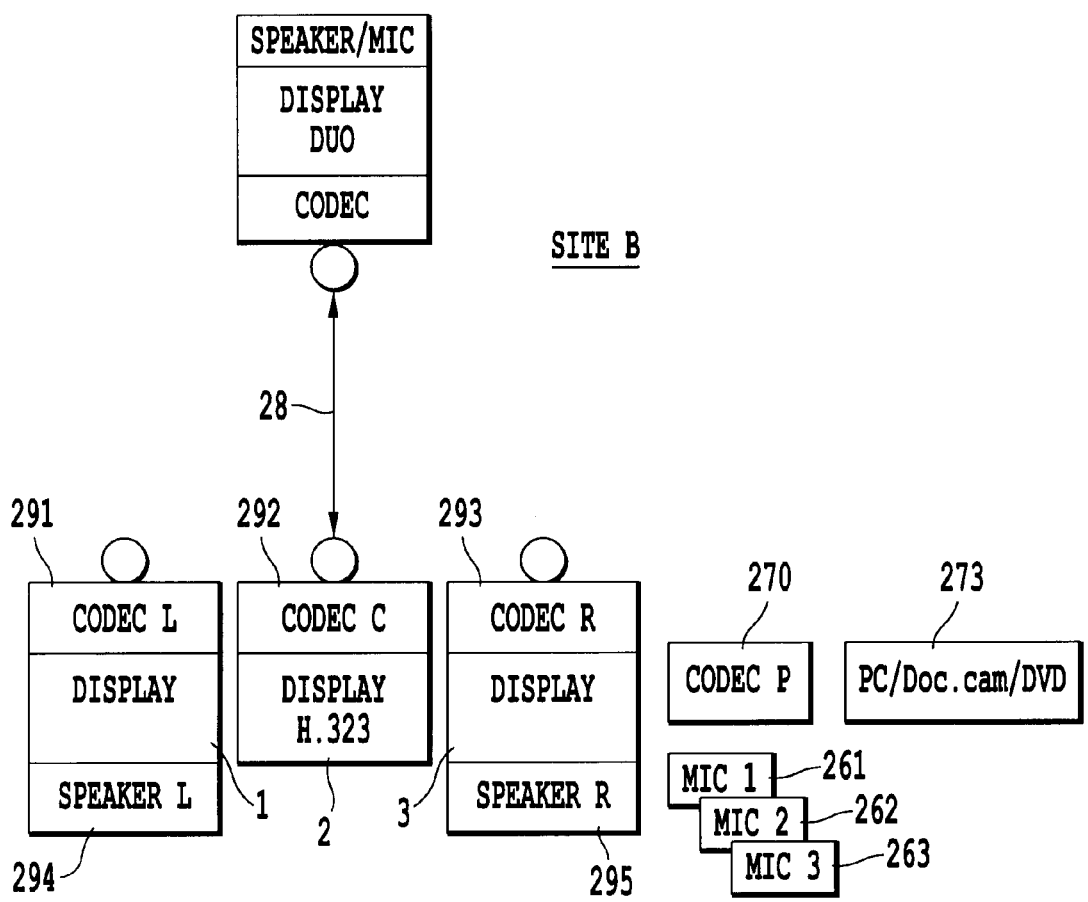
FIG. 12 is an illustration of a GUI showing speed dial 5, contact fields 8, and phone book icons 7 according to one embodiment of the present invention.

More often the conference may be established by using the speed dial 5 selector is located at the center of the GUI and contains a user-selectable field for each contact that the user intends to call frequently, as illustrated in FIG. 12. Moreover, FIG. 12 illustrates one example of a menu of names of user-selectable remote videoconference facilities, some being telepresence systems and some not. The speed dial 5 menu organizes these names alphabetically, but other embodiments include having the speed dial organize the contacts in a customized order specified by the user as to importance to the user or alternatively by the frequency of use. The user may select a contact to participate in a call by either clicking the corresponding contact field or by dragging and dropping a contact to a desired left 41, center 42, or right display replica 43 that are displayed in the GUI 100. Moreover, in reference to FIG. 2, the user may pre-assign the "Bangalore" remote video conference facility to the left most display screen by dragging and dropping the Bangalore label from the menu to the replica of the left most display. In the GUI 100, the left 41, center 42, and right display replicas 43 represent the physical layout of the actual left 1, center 2, and right displays 3 at the local site prior to establishing connections between the sites.

Figure 3:
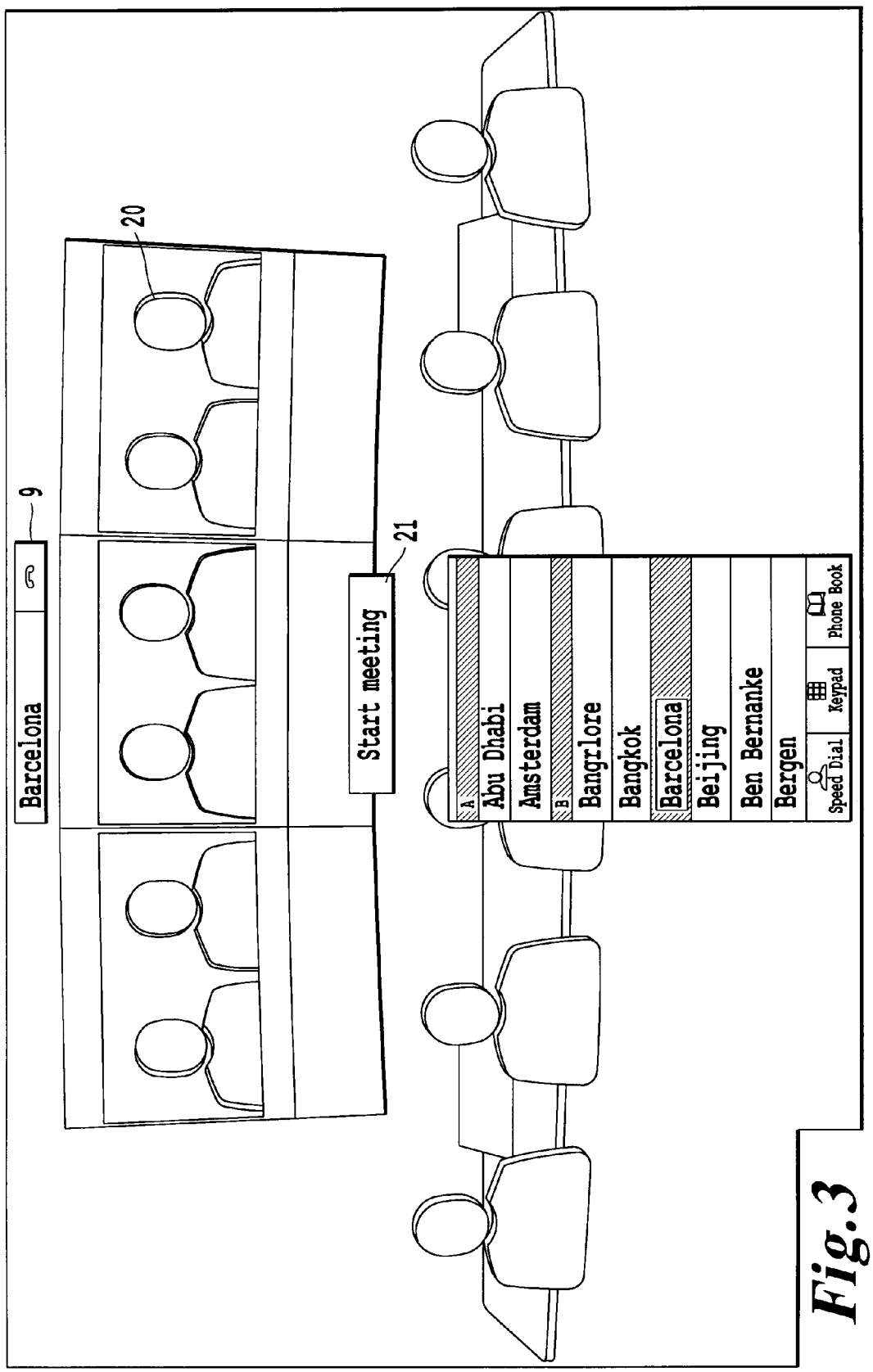
FIG. 3 illustrates the GUI of the control system when selecting a candidate conference participant according to a further example of the present invention.
Figure 5:
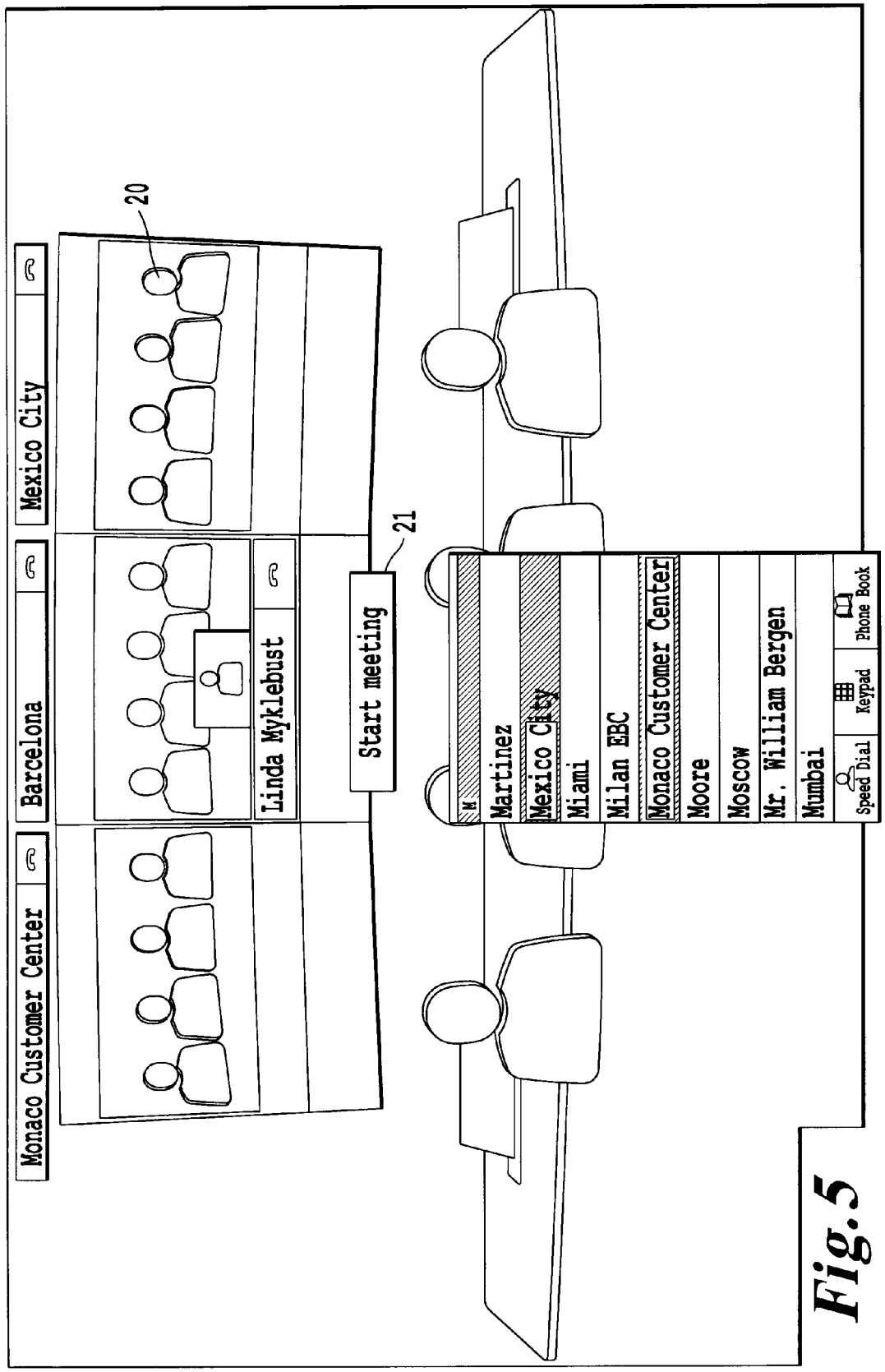
FIG. 5 illustrates an embodiment of the user interface of the control system according to the present invention when a user has selected four end point locations to participate in the call (three T3 telepresence systems and one briefer)

The content of these display replicas will depend on the videoconference status and the configuration selected. In the nominal state and when a configuration has been selected so that there are no participants designated to be viewed in a given display, then the respective display replica will be empty as shown in FIG. 12 for the left, center, and right displays 1, 2, 3. In the active state when a remote participant is designated to be viewed in a display icon, then one or more avatars 20 will appear in a display icon to indicate that the maximum number of participants available to be viewed in the corresponding display within the site, as shown in FIG. 5. Further a status bar will appear above the display replica to designate the location of the participants who will be viewed in that display, as well as a direct telephone icon 9 illustrated in FIG. 3. If activated by the user, the direct telephone icon would initiate a videoconference with the specific location designated on the status bar. The videoconference could be initiated and include all remote videoconference systems by activating the start meeting icon 21 at any time after meeting participants are selected using the GUI 100. Some display icons may contain avatars 20, but may not have status bars 9 above them such as in FIG. 3. When only one status bar 9 appears above only one display replica 41, 42, 43, but multiple display icons are occupied by avatars in the GUI, it merely indicates avatars in the display icons are all from the same remote location and only one status bar has been provided to reduce redundancy. Other embodiments of the GUI may include status bars that provide other functions, such as deactivating a display 1, 2, 3 in the conference corresponding to that display replicas 41, 42, 43. Instead of a generic avatar, images of certain users will appear if those users are identified as participants in the conference, and an image of their likeness can be saved in memory.

Sometimes meeting participants from multiple remote sites may be represented in a single display icon 41, 42, 43. In this case multiple status bars 9 may be exhibited on the GUI to identify the each possible meeting participant. For example, in the center display icon in FIG. 4, two avatars 20 represent two available meeting participants from Barcelona and one smaller avatar in the same display replica represents a different meeting participant.

As described earlier, a user selects contacts to be included in a conference by either clicking on a contact field in the speed dial 5 or dragging or dropping a contact field 8 to a desired left, center, or right display replica on the GUI where the contact may ideally be viewed during a conference. The controller for the GUI responds to the user selecting a contact field by populating the left, center, and right display replicas 41, 42, 43 with avatars depending on the configuration of the equipment at the remote end point, the quantity of remote end points to be included in the call and the preferred location of each of these remote end points on the screen.

In an exemplary embodiment, the GUI is ideally designed to configure conferences with other three camera (T3) telepresence systems; however, it also enables the user to set up video conferences with: single screen (T1) telepresence systems, personal non-telepresence video conferences, a non-telepresence meeting teleconference, and/or other videoconferencing units.

Figure 9A:
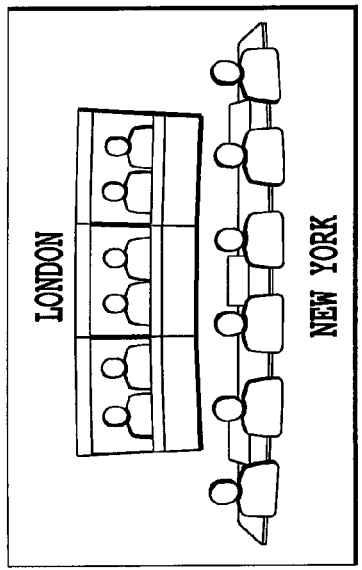
FIGS. 9 a-f show various display replicas presented on the GUI according to the present invention.

In the point-to-point call to another T3 teleconference system, the avatars can be displayed in the GUI as shown in FIG. 9(a). For example, each T3 site has three displays and each corresponding display replica 41, 42, 43 is populated by two avatars 20 meaning that up to two meeting participants may appear in each of the displays, nominally resulting in a total of up to six people to participate from each side. The GUI 100 can also configure the telepresence system to operate in directional audio stereo and the cameras will capture each group of up to two participants with predefined pan, tilt, and zoom capability.

Figure 4:
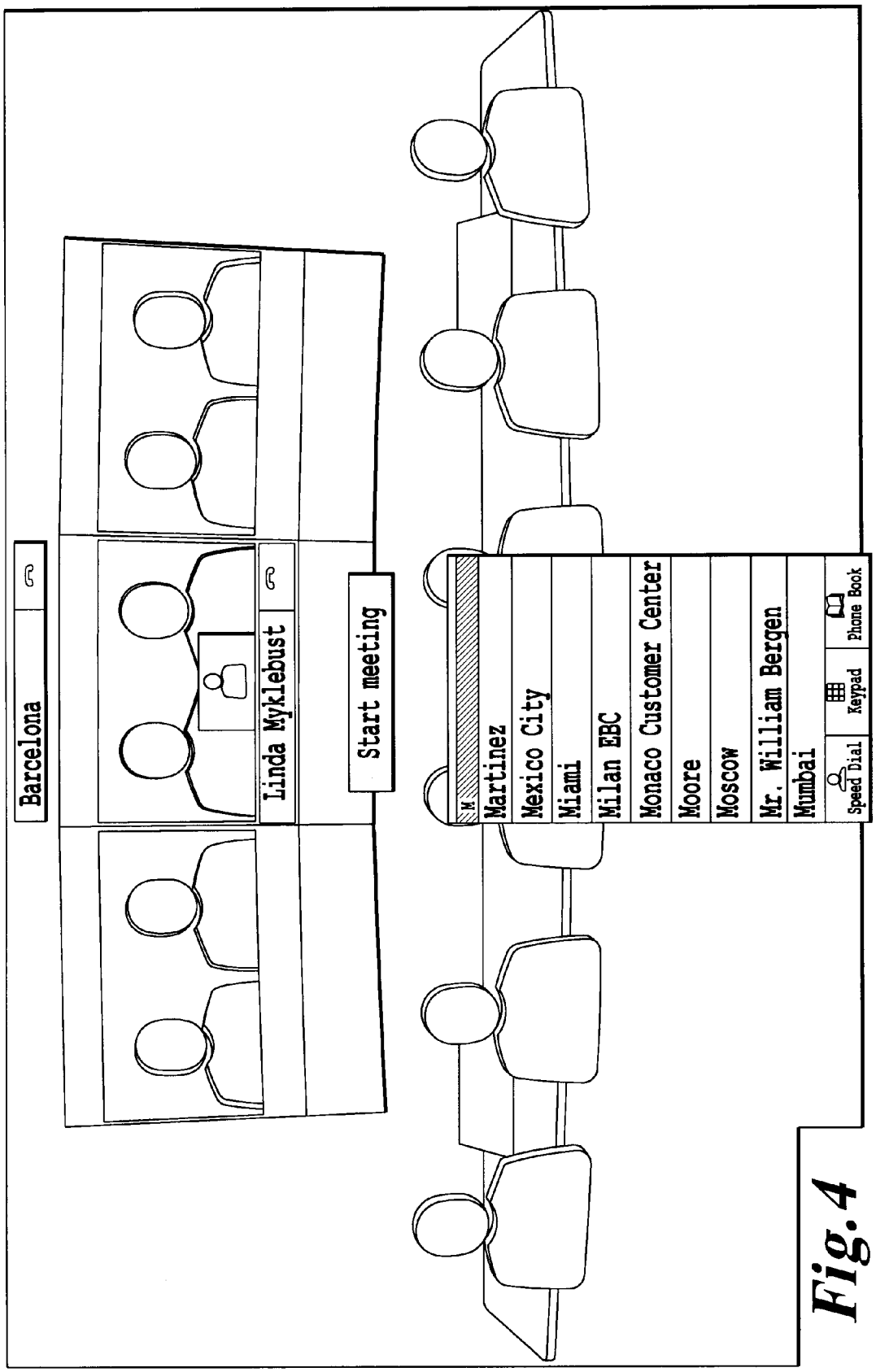
FIG. 4 illustrates the GUI of the control system according to the present invention when a user has selected two end point locations (a T3 telepresence system and a briefer) to participate in a conference.
Figure 9B:
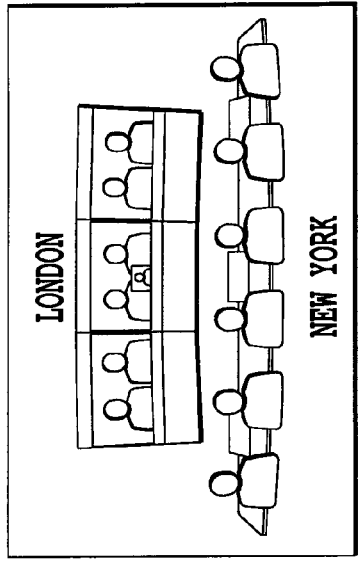

FIG. 9(b) shows an alternative configuration that provides the user with the ability to designate a single non-telepresence system to be added to the conference. A single non-telepresence end point is also known as a "briefer." The user may place a briefer in either the left, center, or right displays 1, 2, 3 by using the GUI. In FIG. 9(b) the briefer is displayed as a picture-in-picture in the center display replica. When this configuration is arranged within the GUI with the speed dial menu applied, it appears as shown in the example of FIG. 4. In this case, the two T3 telepresence systems can still provide directional audio stereo. The cameras can each be able to capture a group of two participants with the capability for predefined pan, tilt, and zoom. However, a picture of the briefer will appear as a smaller picture within either the left, center, or right displays and their respective icons in the GUI. The smaller picture is also known as a "picture-in-picture." In this case the briefer can receive a voice-switched picture of either of the T3 telepresence systems also on the call. The voice-switched picture received by the briefer's videoconferencing system can depend on which T3 end point is talking louder into the videoconferencing system. The voice-switched picture received by the briefer will be a video image from all three cameras stitched together to show only participants from the single remote T3 telepresence end point. The briefer can also receive mono audio corresponding to the voice switched picture.

Figure 9C:
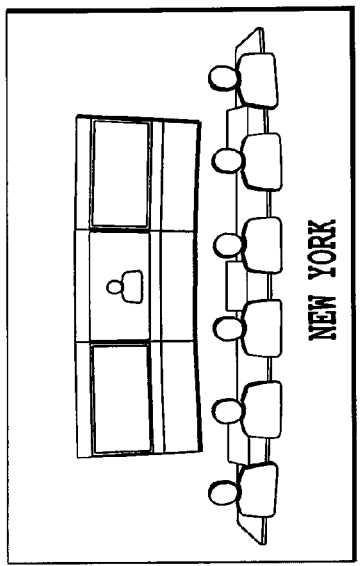
Figure 9D:
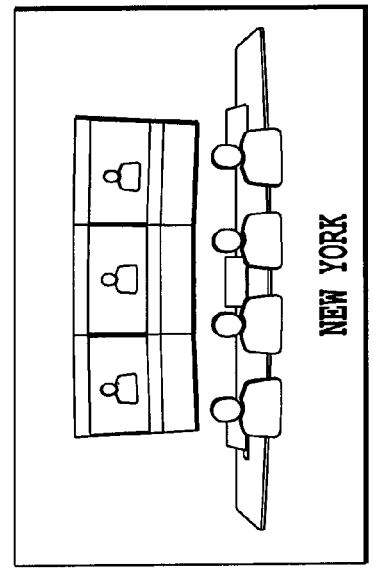
Figure 13:
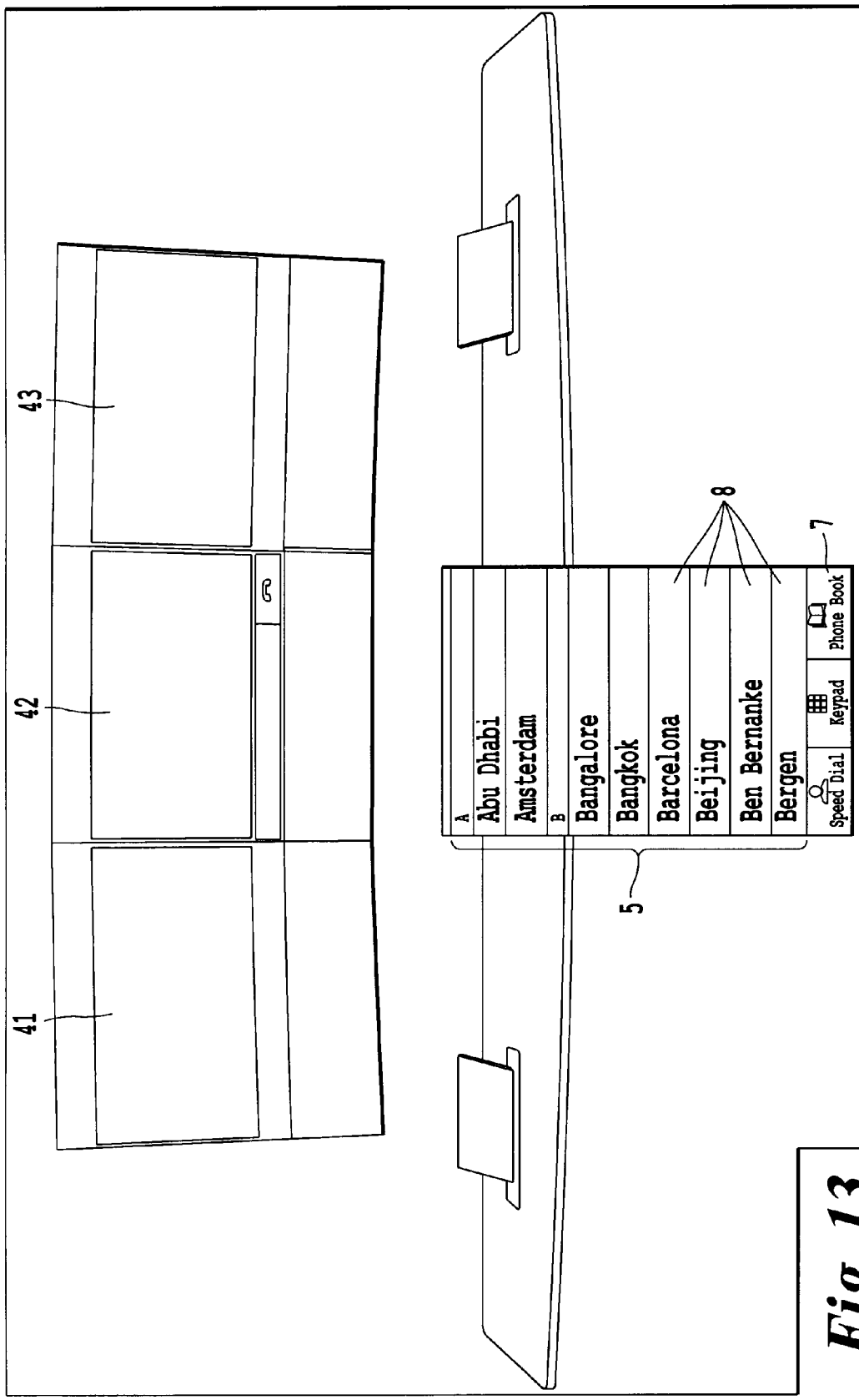
FIG. 13 is an illustration of a telepresence videoconferencing meeting with six local participants (A1 to A6) and a briefer according to one embodiment of the present invention.
Figure 14:
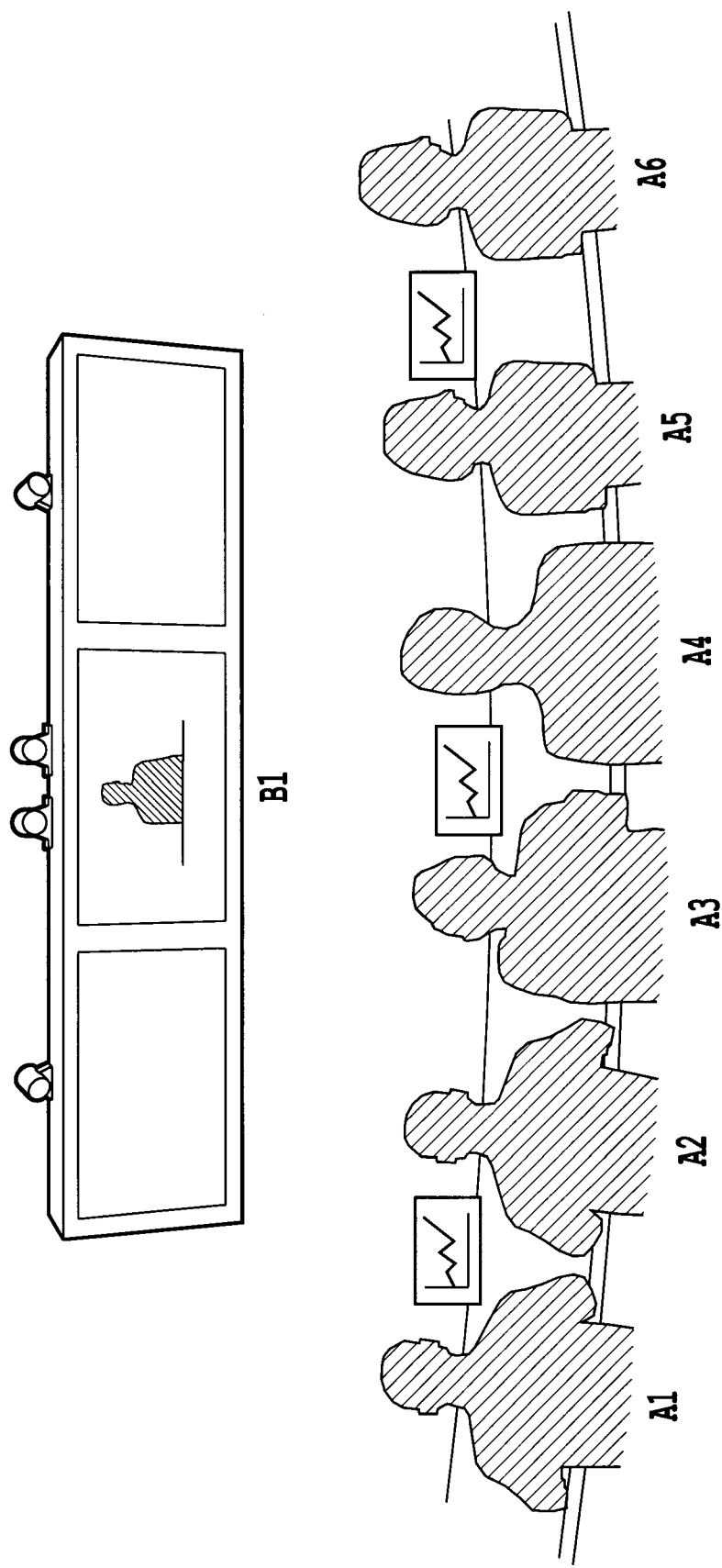
FIG. 14 is an illustration of a telepresence videoconferencing meeting with four local T3 participants (A2 to A5) and three briefers according to one embodiment of the present invention.

Alternatively, instead of a point-to-point call with another T3 telepresence system, the user may configure a videoconference with up to three briefers, each may occupy their own display as represented by avatars in each left, center, and right display replicas 41, 42, 43 (FIG. 9(d)). In this configuration, the GUI enables the user's T3 telepresence system to receive only mono audio from each briefer participating in the call. The image that the briefer receives is dependent upon whether there is one or multiple briefers on the call. If there is a call with one briefer, then the briefer will view all possible six participants at the T3 telepresence end point where each camera captures up to two participants at the user's T3 telepresence end point and each camera has a predefined pan, tilt, and zoom. The corresponding GUI is shown in FIG. 9(c) and the resulting meeting is shown in FIG. 13. In the case where there are more than one briefer on the call, then briefers may see four participants from the user's T3 room and each briefer may see the other briefers, but not themselves. FIG. 14 shows the resulting meeting and FIG. 9(d) shows the GUI that creates the meeting. FIG. 14 shows hatch mark outlined white images (only A1 and A6) who are not in the videoconference because they are outside the active camera angle required for telepresence.

The GUI allows for a user selection between voice-switch mode of operation and round-table mode of operation. Voice switched, presents on the screen the loudest speaker, and so video images of remote locations are switched depending on which remote users are actively speaking.

Figure 9E:
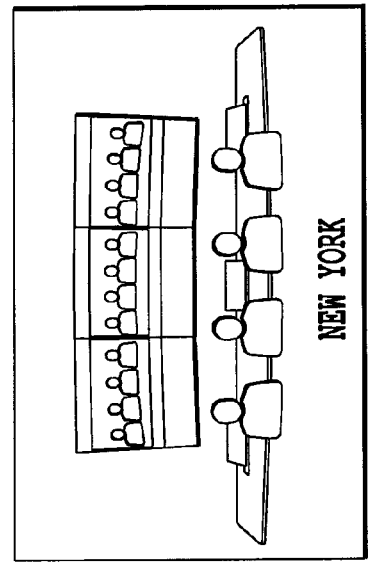
Figure 16:
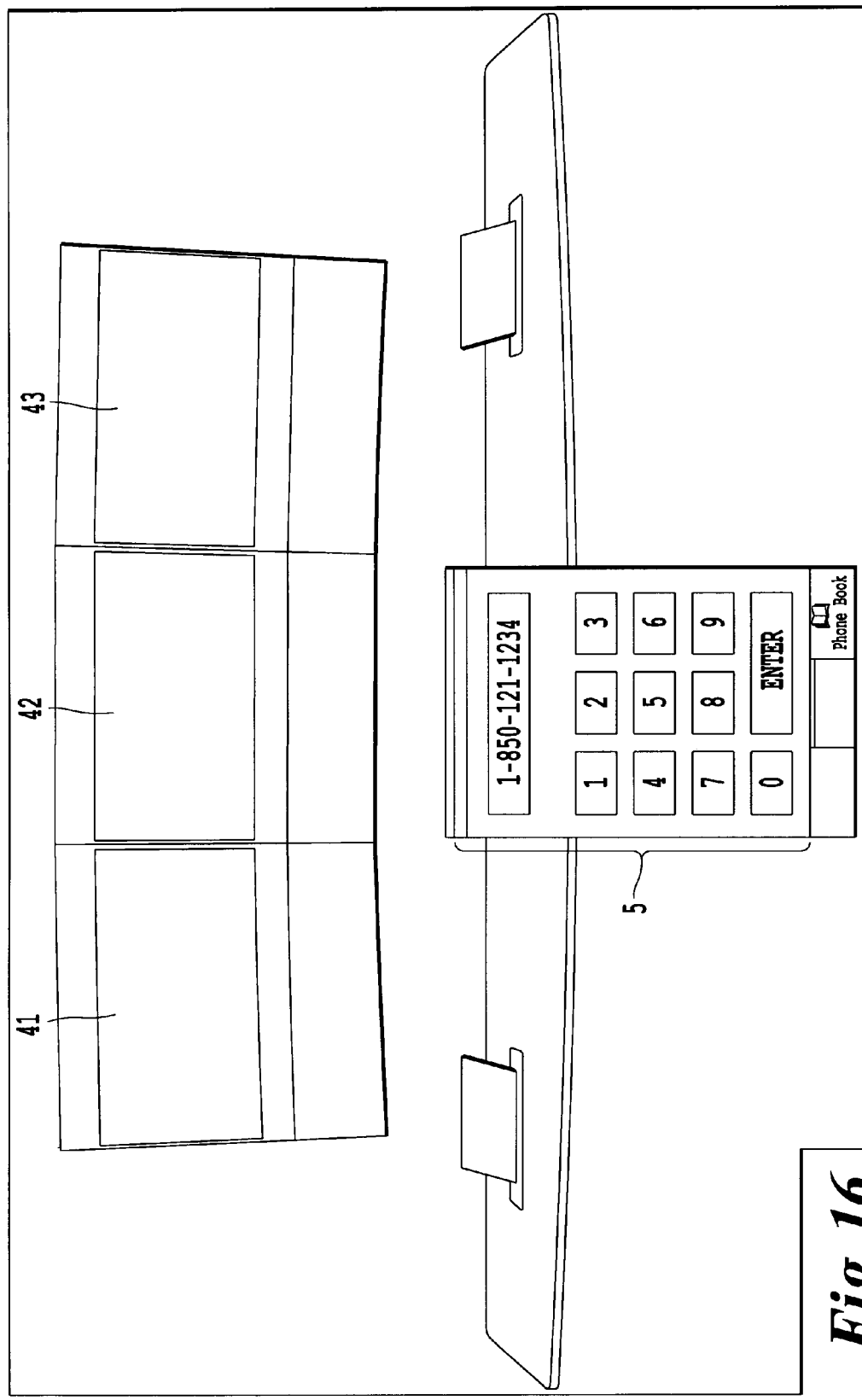
FIG. 16 is an illustration of a T3 telepresence videoconferencing meeting with four telepresence participants (one local and three remote)

The GUI also can enable the user to configure a call setup with multiple telepresence systems. A set up with multiple telepresence systems can be called a "roundtable", "continuous presence", or "OneTable." In the roundtable setup only four participants may be viewed from any telepresence system available on the call. The participants are shown in FIG. 16 and the corresponding GUI is shown in FIG. 9(e). The telepresence system in this example may be limited to showing four participants instead of the six participants available in other configurations due to various potential technical factors such as the camera angle needed to maintain the telepresence experience or the maximum field of view of the camera. However, briefers can also be added to the roundtable conference call and are exhibited as a picture-in-picture as shown in FIG. 5.

Figure 9F:
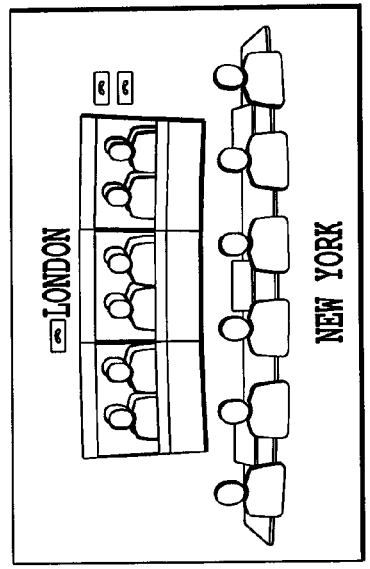

Moreover, the GUI may configure a call setup with multiple telepresence showing all six participants from each site except the user's endpoint can only be able to see one telepresence endpoint at a time. The GUI allows the user to switch between each telepresence endpoint on the call using replicas on the GUI. See FIGS. 9(f), 18, and 19. When there is insufficient display room for the remote participants to be display simultaneously, other participating members, who are not visually displayed, are presented as location labels, or names in a listing on the GUI. This way, the presence of the unseen participants is not forgotten.

The Keypad icon 6 is used to add endpoints to the conference when they are not available in the Speed Dial 5. The keypad has icon buttons to enter the phone number of desired conference participants and the GUI 100 can enable the number to be called when the conference is to begin. When participants are added to the conference via the Keypad 6, the GUI and its associated logic assume these added participants are briefers.

The Phone Book icon 7 is used in a similar manner as the Speed Dial as to selecting meeting participants and adding their names to the display icons. The difference between the phone book icon 7 and speed dial icon 5 is that the Phone Book is provided to be an extensive listing of possible videoconferencing participants that is not as customizable by the user as the Speed Dial. The GUI can access Phone Book entry fields via the network for example. One embodiment is to populate Phone Book using the TANDBERG MANAGEMENT SYSTEM (TMS), or similar management and scheduling software for videoconferencing networks, which can be based on a LAN/WAN enterprise network as shown in FIG. 10 of provisional application Ser. No. 61/097,779. Other options are to add information manually, or to automatically populate attributes based on a previous call to particular sites. An example attribute is the type of system, e.g., 3-screen telepresence (T3); 2-screen telepresence (T2); one-screen telepresence (T1); personal video endpoint; and meeting room system. A multipoint control unit (MCU) may be used to allow for providing compatible communications between different manufacturers.

Figure 6:
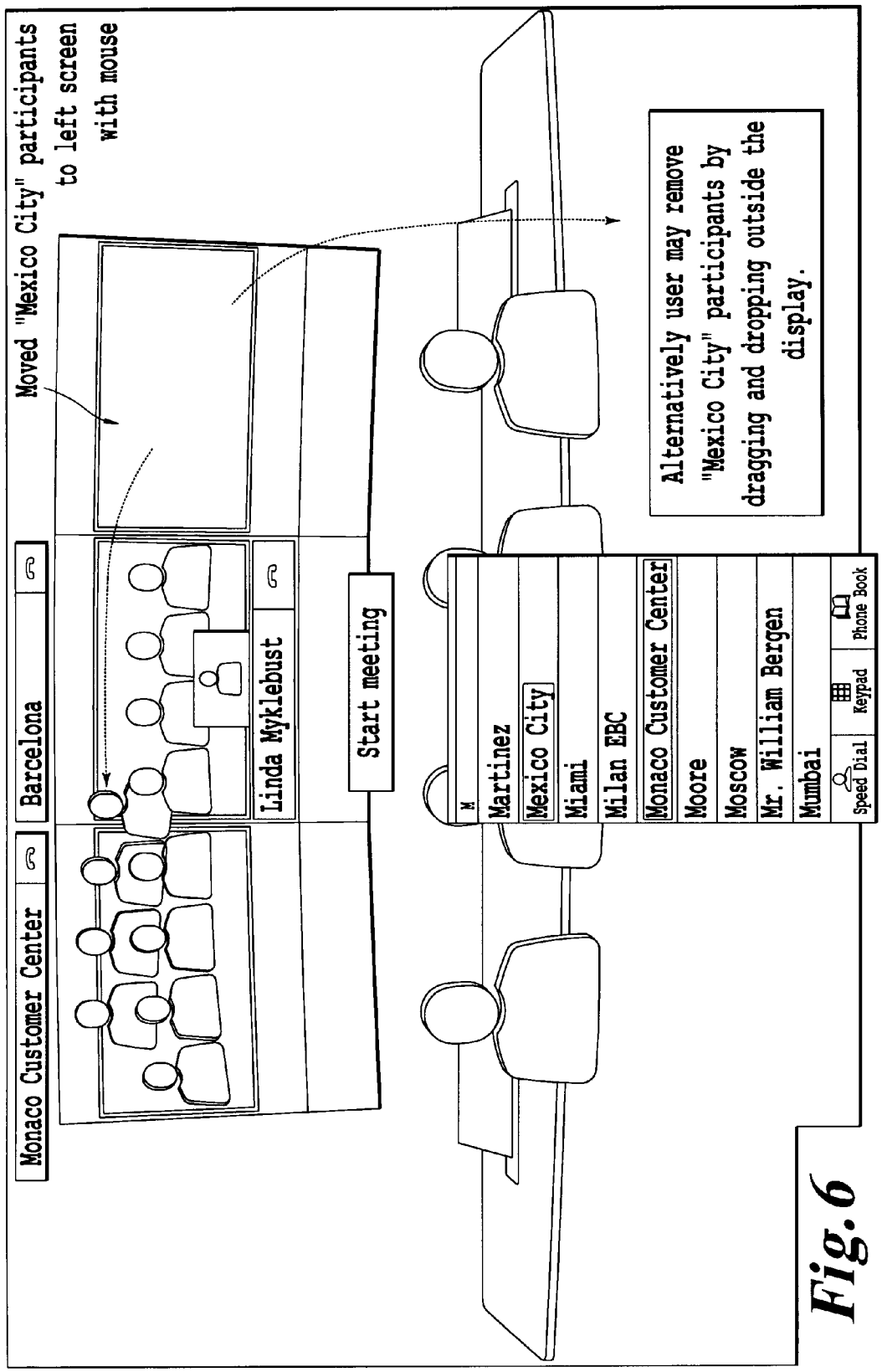
FIG. 6 illustrates the user reassigning remote end point locations using dragging and dropping operations according to one embodiment of the present invention.
Figure 7:
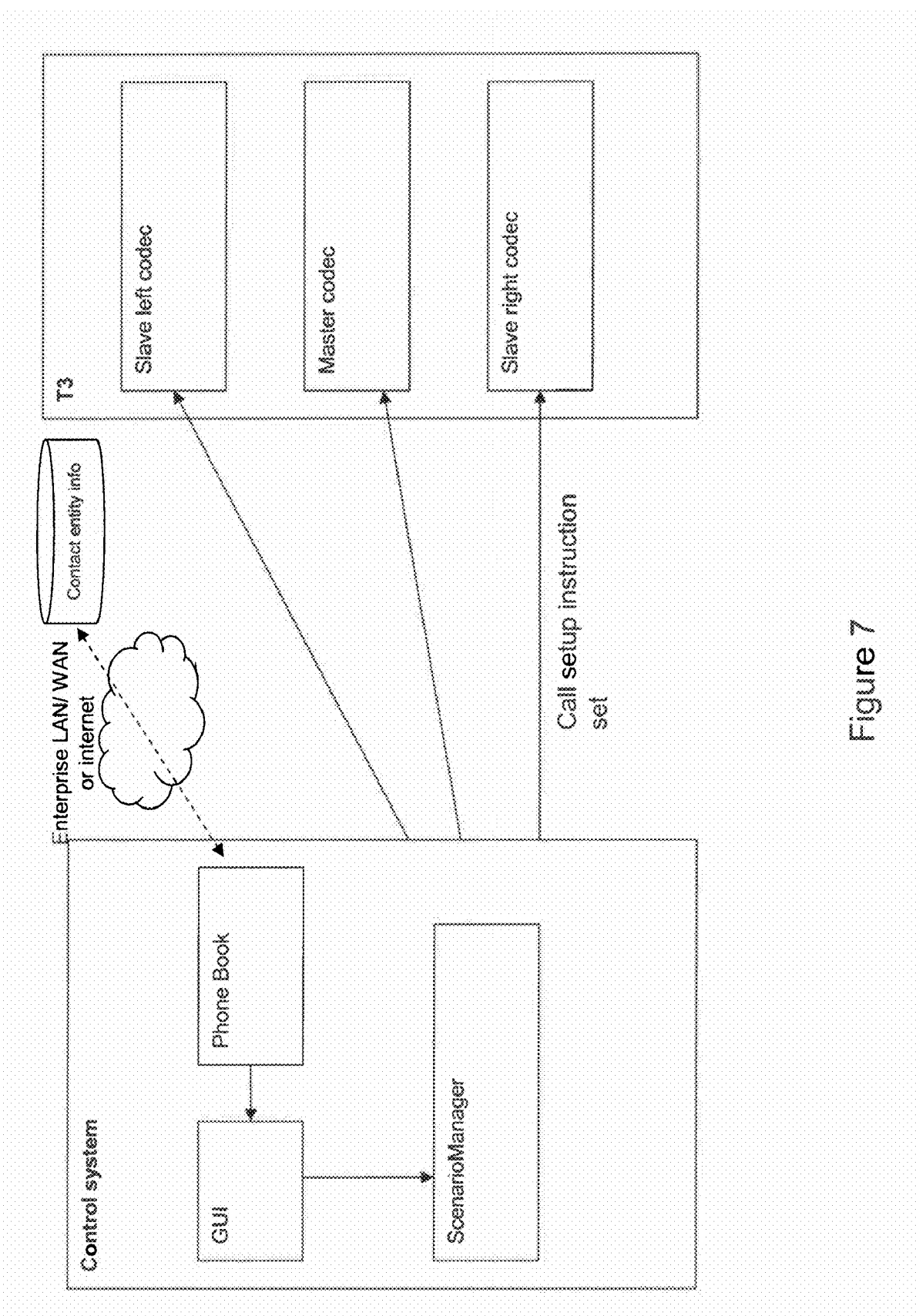
FIG. 7 is a graphical representation of sending call setup instruction set information from the control system to the codec(s)

The GUI of one or more embodiments enables the user, as desired, to place important persons in more prominent positions in the left, center, or right displays within the restriction of the equipment capabilities. FIG. 6 shows a situation where the meeting participants from the right display icon have been moved to the left display icon by dragging and dropping the avatars in the display replicas in the GUI. The image on a telepresence videoconference display 1, 2, 3 is dependent upon codec hardware. The control system can send updated instructions to the codec hardware responsible for the corresponding displays so that the images appear in the desired displays and that cameras with appropriate camera angles are used to record the meeting participants making eye contact with the correspondingly updated display contents, and that other video conferencing resources (such as one or more MCU units) are incorporated as needed. The system shown in FIG. 7 may be TS, and include a processor and memory like that discussed with respect to FIG. 17.

Figure 8:
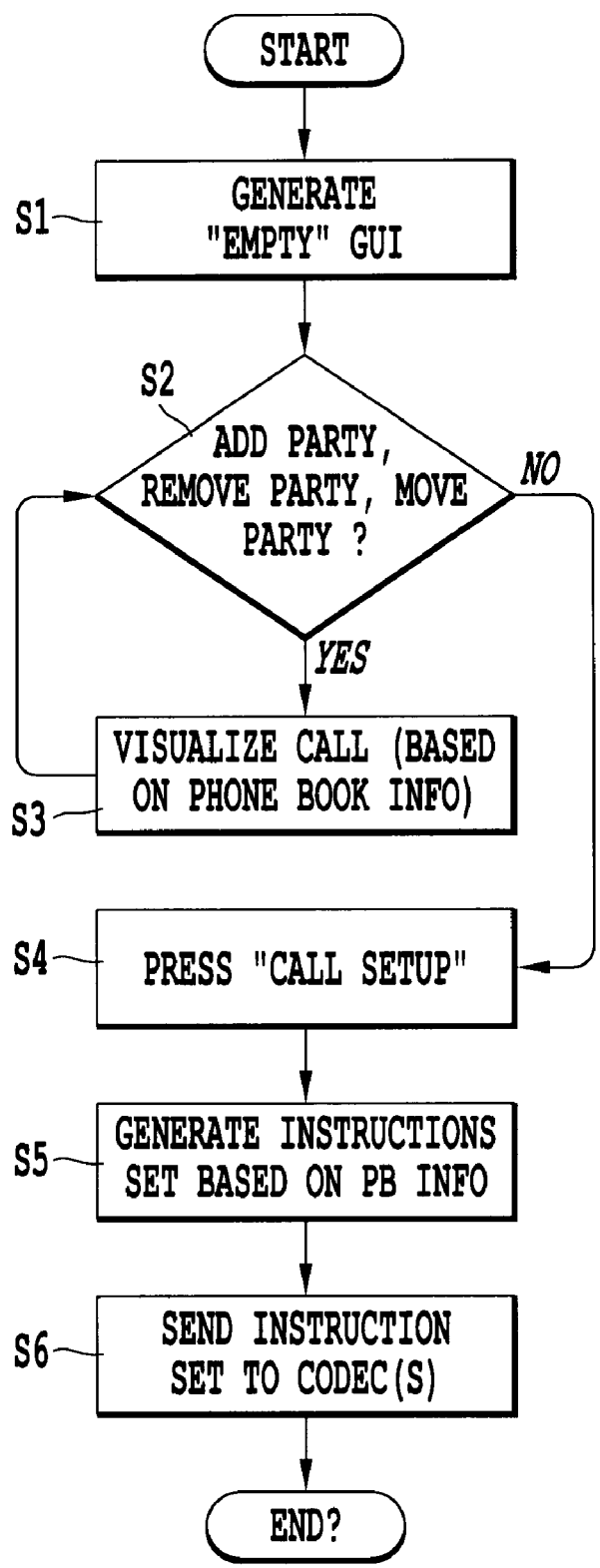
FIG. 8 is a logical flow chart of the steps required to set up a meeting using the graphical user interface (GUI) according to one embodiment of the present invention.

FIG. 8 shows a flow chart describing the process steps for identifying meeting participants, configuring a meeting, and sending the instructions to the various codecs according to an example. The process begins in step S1 where a user generates an "empty" GUI. The user may access the GUI from any combo display which is located in the conference room containing the user's endpoint. The GUI is usually empty when the user's end point is not in use, but if the GUI is not empty then the user may drag and drop any contents of a display icon out of the display icon until all display icons are empty. The combo screen is a touch sensitive screen and the user may drag and drop with the touch of her finger to the screen. Alternative embodiments may allow dragging and dropping with the use of a mouse and cursor or via voice commands. The process then proceeds to step S2 where the user adds parties to the conference being setup. The user adds each party by clicking the contact field icon for every party to participate in the conference. The contact fields may be in the Speed Dial 5 or the Phone Book 7. When a contact field icon is selected by the user, then the GUI can use the information about the videoconferencing system to determine which display screens can be used to display the participants associated with that contact field. The process then moves to step S3 where the GUI can indicate the displays that it might use for displaying these conference participants by populating those selected displays with avatars to enable the user to "visualize" the call. See FIGS. 5 and 8 as examples. When a TS is included to help establish the connections and pre-assignments of images to displays, the TS provides an initial pre-arrangement, which may later be overridden by a user at the local telepresence facility prior to establishing the connections, or during the video conference. Once the GUI reflects the current setup with avatars then the process moves back to step S2 where the user has the opportunity to add, remove, or move a party in a display. The user may move participants from one display screen to another by dragging and dropping avatars into different display icons.

FIG. 6 depicts four avatars from the right display icon being moved to the left display icon. Sometimes the teleconference equipment does not allow participants to be associated with different displays because of camera angles that prevent telepresence characteristics or other data bandwidth limitations. In these cases when the user attempts to move the avatar to a display where the system cannot accommodate the move, then the GUI will not allow the avatars to be moved. Lastly, a user may remove a participant by dragging and dropping outside of the display icon as shown in FIG. 6.

The user may begin process step S4 when no additional parties need to be moved, removed, or added. In step S4 the user presses the "call setup" icon to start the meeting. The "call setup" icon is depicted in FIG. 5. Once the icon is pressed then a series of process steps follow to begin the call. In the next step, the computerized control system automatically collects all information relative to the parties that are to participate in the meeting. See FIG. 7. The control systems transfers this information to a ScenarioManager to generate instruction sets for the local telepresence equipment to set up the call and for the remote equipment at the other end points. The scenario manager can be hardware and software that converts the information configured in the GUI to information needed by the codecs to initiate the videoconference and operate during the videoconference. The process automatically moves to step S6 where the instructions generated in the control system are sent to the local and remote end points to set up the call. The instructions, consistent with standards-based communications, are incorporated in an open field in the message flow specifying the control protocol of establishing video conference call, such as ITU H.241, H.242 or H.243. A controller, processor for a master codec, or remote control of the present invention may be implemented consistent with the corresponding description contained in commonly owned U.S. Pat. No. 7,295,613 and U.S. patent application 60/895,331, the entire contents of which being incorporated herein by reference.

Another embodiment of the invention stores remote teleconference contact information in the GUI for conference calls that were made previously. This information would be made accessible automatically to the user in the GUI the next time the GUI is used to set up a future meeting.

Another embodiment of the invention allows a user to configure a videoconference meeting real-time during a telepresence videoconference session. This GUI ability would allow the user to change the position of various participants on the display screens 1, 2, 3 as needed.

Another embodiment of the invention stores future meeting configurations in a scheduling program so that the future teleconferences may be associated with specific meeting dates and times.

Another embodiment of the invention provides the ability to shut down the meeting in progress by providing a shutdown icon in the GUI, or by the users disconnecting remote video conferencing facilities from the conference by dragging and dropping the images of particular remote facilities from the displayed replica of the displays.

Another embodiment of the invention allows the user to enter into the GUI information about the specific upcoming conference (e.g., distance from the cameras to the participants, number of participants, or layout of the participants' seating locations within the videoconference room) to enable the videoconference system to properly adjust the system to accommodate that meeting.

Another embodiment of the invention allows users to enter into the GUI the names and seating locations of various participants and this information will be used by the videoconference system to place "virtual name tags" on the display screens showing the participants' images during the videoconference.

Another embodiment of the invention allows users to use the GUI to configure, control, and end a meeting with a scaled telepresence system based on multiple T1 models placed side-by-side. The number of T1 models utilized in the videoconference would be configurable in the GUI.

Figure 17:
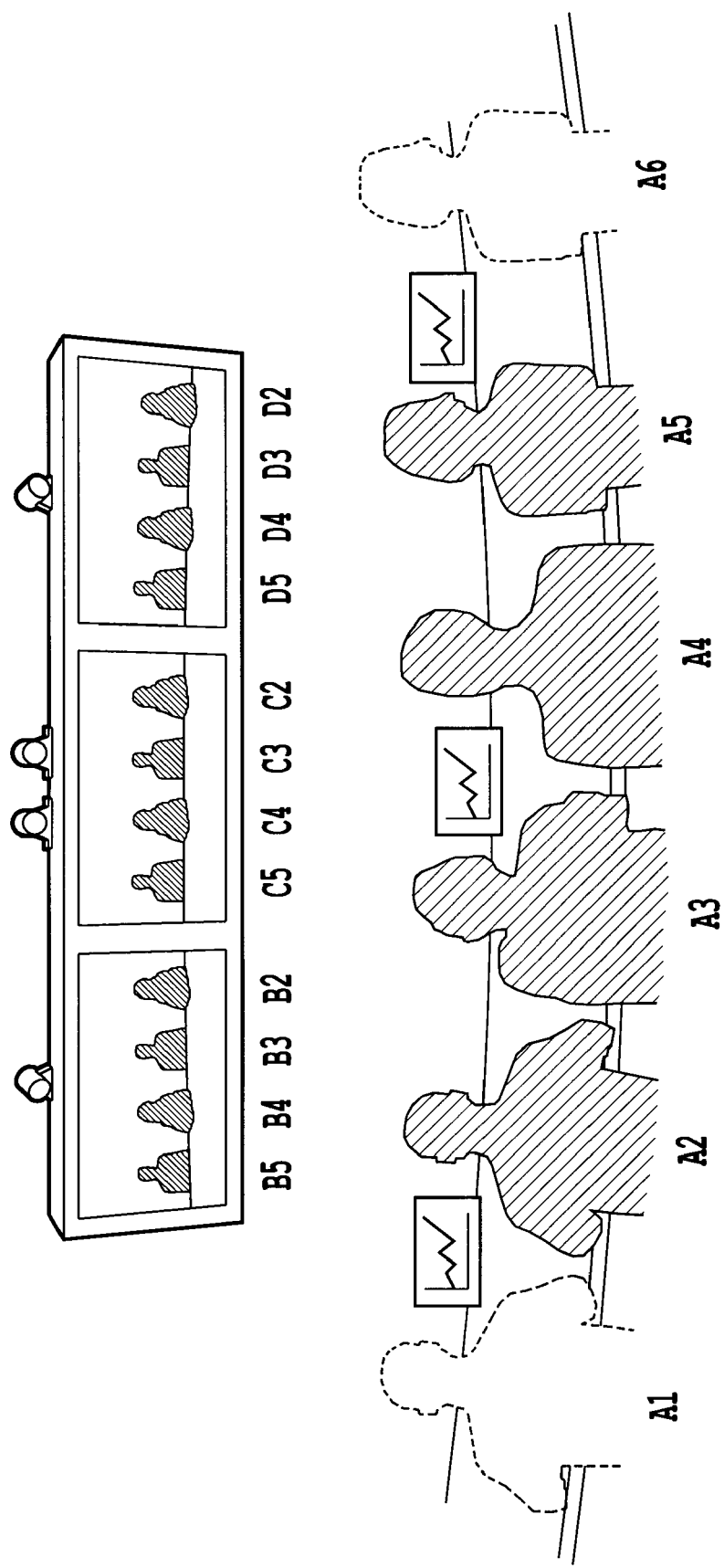
FIG. 17 illustrates a computer system upon which an embodiment of the present invention may be implemented.

FIG. 17 illustrates a computer system 1201 upon which an embodiment of the tactile input device, or TS, or mobile communication device according to the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as touch panel display or liquid crystal display (LCD), for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Further, it should be appreciated that the exemplary embodiments of the invention are not limited to the exemplary embodiments shown and described above. While this invention has been described in conjunction with exemplary embodiments outlined above, various alternatives, modifications, variations and/or improvements, whether known or that are, or may be, presently unforeseen, may become apparent.

Accordingly, the exemplary embodiments of the invention, as set forth above are intended to be illustrative, not limiting. The various changes may be made without departing from the spirit and scope of the invention. Therefore, the systems and methods according to exemplary embodiments of this invention are intended to embrace all now known or later-developed alternatives, modifications, variations and/or improvements.

The invention claimed is:

1. A computer-implemented interface for a local telepresence video conferencing facility that communicates with remote telepresence video conferencing facilities each including a plurality of cameras and a plurality of displays, said computer-implemented interface comprising:
    a tactile input device having a touchscreen display that converts forces applied by a user into control commands, said touchscreen display positioned within reach of a user of the local telepresence video conferencing facility when the user is positioned at a station captured by one of the plurality of cameras, said touchscreen display includes a displayed replica of a physical layout of the plurality of displays arranged in the local telepresence video conference facility;
    a signal interface that exchanges video signals and voice signals between the local telepresence video conferencing facility and the remote telepresence video conferencing facilities; and
    a controller circuit that pre-assigns the plurality of displays at the local telepresence video conferencing facility to respective video images from the remote telepresence video conference facilities such that respective video images from the remote telepresence video conference facilities will be displayed on corresponding displays at the local telepresence video conferencing facility once communications connections are made, said controller pre-assigns the plurality of displays according to control commands from the tactile input device prior to establishing the communication connections with the remote telepresence video conference facilities, wherein
    said touchscreen display presents avatars of remote conference participants to illustrate pre-assignments of displays to particular remote telepresence video conference facilities prior to the communication connections being made.

2. The interface of claim 1, further comprising:
    a teleconference server that receives input from said controller and provides the controller with initial pre-assignments of displays to respective of the remote telepresence video conference facilities, wherein
    said controller is configured to change the initial pre-assignments based on control commands received from the user via the touchscreen display.

3. The interface of claim 1, wherein
    said touchscreen display is mounted to a table in front of the user at the station at an inclination with respect to an upper surface of the table, such that a top edge of said touchscreen display is closer to the one of the plurality of cameras that captures said station than a bottom edge of the touchscreen display, and said top edge is at a higher elevation than said bottom edge with respect to the upper surface of the table.

4. The interface of claim 1, wherein said touchscreen display includes a drag-drop feature that permits said user to drag and drop avatars to different displays within the displayed replica of the physical layout of the plurality of displays.

5. The interface of claim 1, wherein said touchscreen display includes a selection mechanism that provides user-selection of a voice-switched mode of operation and round-table mode of operation for displaying the remote telepresence video conference facilities.

6. The interface of claim 1, wherein the touchscreen display provides a pixel-to-pixel mapping between respective of the plurality of displays and displays included in the displayed replica.

7. The interface of claim 1, further comprising:
an RFID detector; and
a plurality of RFID transmitters, said RFID detector configured to wirelessly receive pre-assignments selections transmitted from one of the RFID transmitters when said one of the RFID transmitter is within an operable range of said RFID detector.

8. The interface of claim 1, wherein:
said tactile input device includes a mobile telephone programmed with a downloaded application that permits the user to pre-assign the plurality of displays on the mobile telephone prior to entering a room hosting the local telepresence video conferencing facility.

9. The interface of claim 1, wherein said touchscreen display provides a close-down mode of operation for closing down connections by dragging and dropping the avatars away from images of the displays presented on the touchscreen in response to forces applied by the user to the touchscreen display.

10. A computer-implemented method for pre-assigning displays of a local telepresence video conferencing facility with video images of remote telepresence video conferencing facilities, each of the local and remote telepresence video conferencing facilities including a plurality of cameras and a plurality of displays, said method comprising:
applying forces from a user to a tactile input device having a touchscreen display and converting the forces into control commands, said touchscreen display positioned within reach of a user of the local telepresence video conferencing facility when the user is positioned at a station captured by one of the plurality of cameras;
displaying on said touchscreen display a displayed replica of a physical layout of the plurality of displays arranged in the local telepresence video conference facility;
exchanging video and voice signals through a signal interface between the local telepresence video conferencing facility and the remote telepresence video conferencing facilities;
pre-assigning through a controller circuit the plurality of displays at the local telepresence video conferencing facility to respective video images from the remote telepresence video conference facilities such that respective video images from the remote telepresence video conference facilities will be displayed on corresponding displays at the local telepresence video conferencing facility once communications connections are made, said pre-assigning step includes assigning the plurality of displays according to control commands from the tactile input device prior to establishing the communication connections with the remote telepresence video conference facilities; and
presenting avatars of remote conference participants on said touchscreen display to illustrate pre-assignments of displays to particular remote telepresence video conference facilities prior to the communication connections being made.

11. The method of claim 10, further comprising:
receiving inputs at a teleconference server from said controller and providing the controller with initial pre-assignments of displays to respective of the remote telepresence video conference facilities;
receiving control commands from the user via the touchscreen display to change the initial pre-assignments; and
changing via the controller the initial pre-assignments based on control commands.

12. The method of claim 10, further comprising:
dragging and dropping avatars to different displays within the displayed replica of the physical layout of the plurality of displays based on input from the touchscreen display.

13. The method of claim 10, further comprising:
selecting on the touchscreen display between a voice-switched mode of operation and round-table mode of operation for displaying the remote telepresence video conference facilities.

14. The method of claim 10, wherein:
said pre-assigning step includes moving an RFID transmitter within an operable range of an RFID detector that is coupled to said controller; and
receiving wirelessly at the RFID detector pre-assignment selections transmitted from the RFID transmitter.

15. The method of claim 10, further comprising:
downloading an application to a mobile telephone that programs a processor in the mobile telephone that permits the user to pre-assign the plurality of displays on the mobile telephone prior to entering a room hosting the local telepresence video conferencing facility.

16. The method of claim 10, further comprising:
closing down connections to the remote telepresence video conferencing facilities by dragging and dropping the avatars away from images of the displays presented on the touchscreen display in response to forces applied by the user to the touchscreen display.

17. A non-transitory computer program product having instructions that when executed by a processor perform a method that pre-assigns displays of a local telepresence video conferencing facility with video images of remote telepresence video conferencing facilities, each of the local and remote telepresence video conferencing facilities including a plurality of cameras and a plurality of displays, said method comprising:
converting forces applied by a user to a tactile input device having a touchscreen display into control commands, said touchscreen display positioned within reach of a user of the local telepresence video conferencing facility when the user is positioned at a station captured by one of the plurality of cameras;
displaying on said touchscreen display a displayed replica of a physical layout of the plurality of displays arranged in the local telepresence video conference facility;
exchanging video and voice signals through a signal interface between the local telepresence video conferencing facility and the remote telepresence video conferencing facilities;
pre-assigning through a controller circuit the plurality of displays at the local telepresence video conferencing facility to respective video images from the remote telepresence video conference facilities such that respective video images from the remote telepresence video conference facilities will be displayed on corresponding displays at the local telepresence video conferencing facility once communications connections are made, said pre-assigning step includes assigning the plurality of displays according to control commands from the tactile input device prior to establishing the communication connections with the remote telepresence video conference facilities; and presenting avatars of remote conference participants on said touchscreen display to illustrate pre-assignments of displays to particular remote telepresence video conference facilities prior to the communication connections being made.

18. The computer program product of claim 17, further comprising:

receiving inputs at a teleconference server from said controller and providing the controller with initial pre-assignments of displays to respective of the remote telepresence video conference facilities;

receiving control commands from the user via the touchscreen display to change the initial pre-assignments; and changing via the controller the initial pre-assignments based on control commands.

19. The computer program product of claim 17, further comprising:

dragging and dropping avatars to different displays within the displayed replica of the physical layout of the plurality of displays based on input from the touchscreen display.

20. The computer program product of claim 17, further comprising:

selecting on the touchscreen display between a voice-switched mode of operation and round-table mode of operation for displaying the remote telepresence video conference facilities.

21. The computer program product of claim 17, further comprising:

downloading an application to a mobile telephone that programs a processor in the mobile telephone that permits the user to pre-assign the plurality of displays on the mobile telephone prior to entering a room hosting the local telepresence video conferencing facility.

22. The computer program product of claim 17, further comprising:

closing down connections to the remote telepresence video conferencing facilities by dragging and dropping the avatars away from images of the displays presented on the touchscreen display in response to forces applied by the user to the touchscreen display.

* * * * *